United States Patent [19]
Kuzunuki et al.

[11] Patent Number: 5,917,490
[45] Date of Patent: Jun. 29, 1999

[54] INTERACTIVE INFORMATION PROCESSING SYSTEM RESPONSIVE TO USER MANIPULATION OF PHYSICAL OBJECTS AND DISPLAYED IMAGES

[75] Inventors: Soshiro Kuzunuki, Hitachinaka; Toshifumi Arai, Hitachi; Tadaaki Kitamura, Tomobe-machi; Hiroshi Shojima, Kashiwa, all of Japan

[73] Assignee: Hitachi, Ltd., Tokyo, Japan

[21] Appl. No.: 08/955,151

[22] Filed: Oct. 21, 1997

Related U.S. Application Data

[62] Division of application No. 08/498,238, Jul. 5, 1995, Pat. No. 5,732,227, which is a continuation of application No. 08/213,030, Mar. 15, 1994, Pat. No. 5,436,639.

[30] Foreign Application Priority Data

Jul. 5, 1994 [JP] Japan .................................. P6-153636
Mar. 29, 1995 [JP] Japan .................................. P7-71096

[51] Int. Cl.$^6$ ...................................................... G06F 3/00
[52] U.S. Cl. ............................................................ 345/351
[58] Field of Search ................................... 345/335, 339, 345/350, 351, 358, 968

[56] References Cited

U.S. PATENT DOCUMENTS

| | | |
|---|---|---|
| 4,847,788 | 7/1989 | Shimada . |
| 5,068,809 | 11/1991 | Verhelst et al. . |
| 5,072,412 | 12/1991 | Henderson, Jr. et al. ............... 345/346 |
| 5,319,747 | 6/1994 | Gerrissen et al. ........................ 395/155 |
| 5,367,623 | 11/1994 | Iwai et al. . |
| 5,436,639 | 7/1995 | Arai et al. ................................ 345/156 |
| 5,454,043 | 9/1995 | Freeman ............................... 395/135 X |
| 5,511,148 | 4/1996 | Wellner .................................... 395/106 |
| 5,544,358 | 8/1996 | Capps et al. ............................. 707/523 |
| 5,584,035 | 12/1996 | Duggan et al. .......................... 345/339 |
| 5,745,113 | 4/1998 | Jordan et al. ............................ 345/349 |

FOREIGN PATENT DOCUMENTS 5-19958 1/1993 Japan .

OTHER PUBLICATIONS

"Infobinder: A Pointing Device for Virtual Desktop Environment," Japan IBM Ltd., Information Processing Society of Japan, Sep. 20–22, 1995.

"Bridging the Paper and Electronic Worlds: The Paper User Interface," Proceedings of INTERCHI' 93, pp. 507–512.

(List continued on next page.)

*Primary Examiner*—A. Katbab
*Attorney, Agent, or Firm*—Evenson, McKeown, Edwards & Lenahan, P.L.L.C.

[57] ABSTRACT

An information processing system and method using a file storage unit which stores electronic information and a display unit which displays the electronic information. A discrimination unit discriminates each of a plurality of physical objects indicated by a user. An attribute discrimination unit discriminates changeable attribute information of the physical objects. A link storage unit stores link information designating a correspondence between each of the physical objects and a respective corresponding portion of the electronic information stored in the storage unit. A file operation unit performs a plurality of operations, including: (a) changing an appearance of the electronic information on the display when the electronic information displayed is the corresponding portion of the electronic information which corresponds to at least one of the physical objects; (b) performing different or additional operations on the corresponding portion of the electronic information which corresponds to at least one of the physical objects when the corresponding portion of the electronic information is manipulated; and (c) changing attributes of the corresponding portion of the electronic information which corresponds to at least one of the physical objects when the changeable attribute information of at least one of the physical objects is changed.

22 Claims, 32 Drawing Sheets

OTHER PUBLICATIONS

Proceedings of UIST' 91, ACM, 1991, "The Digital Desk Calculator: Tangible Manipulation on a Desk Top Display." Progress in Human Interface vol. 2, pp. 65–72 (1993).

Wellner, P., "Interacting with paper on the Digital Desk," Comm. on ACM, v. 36, N. 7 Jul. 1993. pp. 87–96.

Mackay, W. et al, "Augmenting ReallIty aDDIng Computational Dimension to paper," Comm. on ACM V. 36, N. 7, Jul. 1993, pp. 96–97.

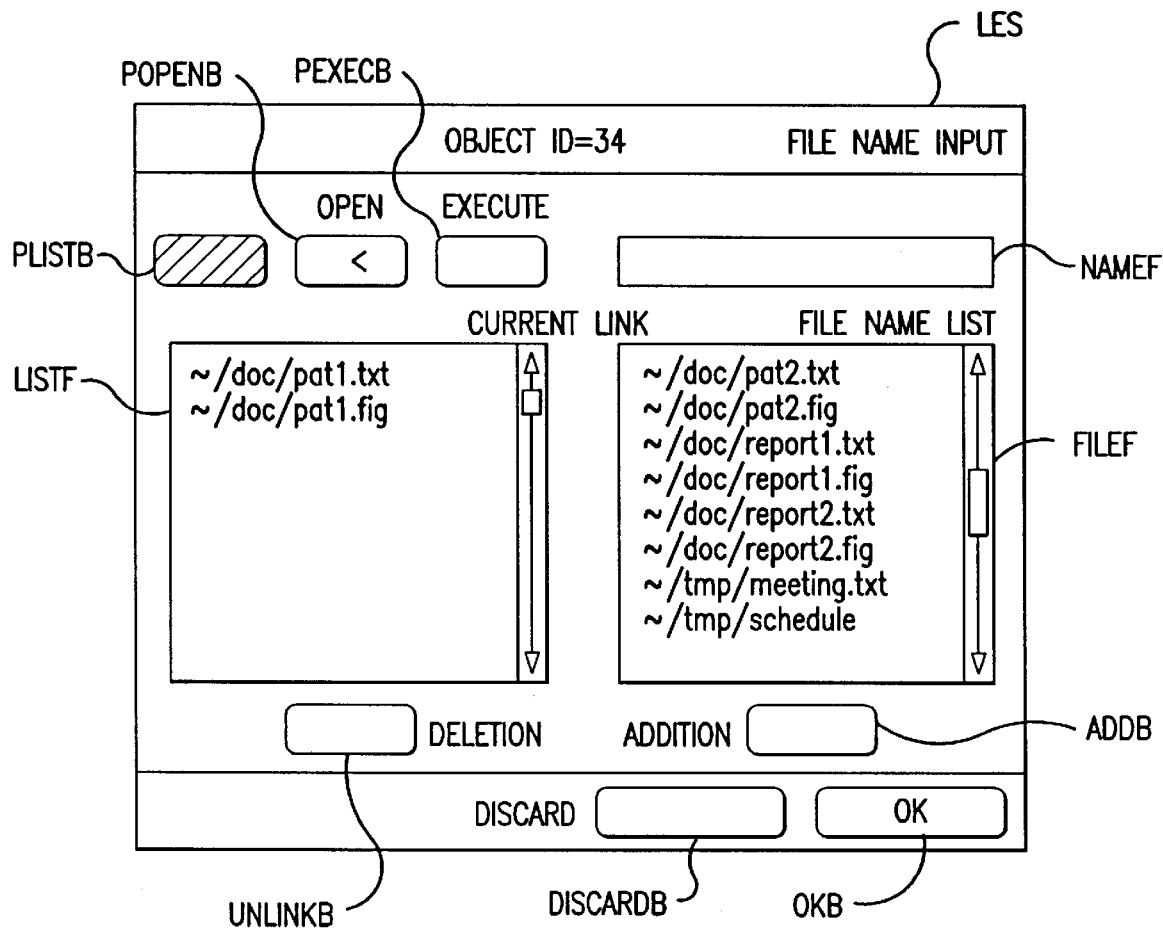

INTERACTIVE INFORMATION PROCESSING SYSTEM RESPONSIVE TO USER MANIPULATION OF PHYSICAL OBJECTS AND DISPLAYED IMAGES

This application is a division of application Ser. No. 08/498,238, filed Jul. 5, 1995, now U.S. Pat. No. 5,732,227, which is continuation of U.S. Ser. No. 08/213,330 filed Mar. 15, 1994, now U.S. Pat. No. 5,436,639.

BACKGROUND AND SUMMARY OF THE INVENTION

This invention relates to an information processing system which operators can use to directly handle images displayed on a display unit inserted into a desk and more particularly to an information processing system suited for instinctly handling images using the actual objects placed on the desk. The terms "actual object" and "physical object" have the same meaning in this application unless otherwise indicated.

As written in "(1) Progress in Human Interface Vol. 2, PP. 6572 (1993)", a data glove used to interact with a computer is available as the conventional technique for improving the computer man-machine interface. Also, in the conventional techniques written in (2) Proceedings of UIST'91, "The Digital Desk Calculator: Tangible Manipulation on a Desk Top Display", the hand of an operator without a glove is detected by a camera, the movement of hand and sheets of paper are monitored, display objects are moved, and "cut & copy" is performed by selecting a character string on a sheet of paper with a finger. In addition, in the conventional technique written in (3) "5-19958 Gazette", the hand of an operator is photographed by a camera and used for pointing.

As a prior art of a method for making information handled in an information processing unit corresponding to an object, there is a system named XAX which is indicated in (4) "Bridging the Paper and Electronic Worlds: The Paper User Interface" (Proceedings of INTERCHI 1993, pp. 507 to 512). The object used in this system is a paper on which a discrimination pattern is printed. A user inputs the content written on such a paper into the system using a scanner or FAX. The system recognizes the pattern printed on the paper and discriminates what kind of paper it is. As a discrimination result, the system understands that the paper is a paper on which the content of a file held by the system is printed or the paper is a written order for instructing file retrieval to the system.

When the XAX system can discriminate the paper as a paper on which a file is printed, the system can indicate the original file to the user. From a viewpoint of the user, the printed paper corresponds to the original file and it can be understood that by indicating the printed paper, the original file is taken out. When the read paper is a written order for instructing file retrieval to the system, the system recognizes the information (for example, the file name and keyword) written on the paper and retrieves the corresponding file. The retrieval result is indicated to the user in a certain form. For example, a retrieval result list or the file content can be printed via FAX or a printer. From a viewpoint of the user, the paper (written order) to be used for retrieval corresponds to the retrieval result and it can be understood that by indicating the paper, the retrieval result is taken out.

In the conventional technique which uses the data glove, the man-machine interface is problematic because the operator feels incompatibility. The operator feels incompatibility because the hand of the operator is covered with the glove. Also, in the other two conventional techniques in which the movement of the hand is monitored by the camera and this is used for the man-machine interface, actual operations cannot be performed instinctly because the correspondence between operations of images and actual objects and the functions of instructions for various operations are not considered concretely.

The prior art mentioned above can retrieve information using a paper or give an instruction to an information processing unit but cannot change dynamically the correspondence between the paper and electronic information and limit the operation to the electronic information because it corresponds to the paper. For example, to increase information which can be taken out by a certain paper, it is necessary to additionally write the attribute (for example, the document name) of new information on the paper. Therefore, by this prior art, it is impossible to perform the aforementioned corresponding operation interactively by viewing the screen.

The prior art mentioned above indicates a concept of erasing information which is displayed on the screen using an object but does not give consideration to map and hold the object to each electronic information. Therefore, it is impossible to take out electronic information using an object or to change the attribute of electronic information via the operation to the object.

The present invention is directed toward providing an improved information processing system which establishes an environment in which the operator can interface with computers in a format similar to actual operation and actual objects can be used as man-machine interface parts.

According to one aspect of the present invention, improved processing is achieved by providing for an operator managed menu driven system for storing the physical object attributes of selected actual physical objects to be used. This feature allows for different operator hands, as well as different physical objects. Since actual physical objects to be used are also used in setting up and storing characteristic features to be compared during information processing, an especially user friendly man-machine interface environment is achieved.

According to preferred embodiments of the present invention, there are provided a method for recognizing the actual object from an image of a camera device; an attribute definition method for associating operations between the recognized actual object and the displayed image; and an attribute dealing method for comparing a characteristic point coordinate of the recognized actual object with the characteristic point coordinate of another actual object or that of the image displayed on the display surface and executing operations defined by the attribute definition method for the associated image when the comparison result is within a given value. This object is achieved in the display unit, the camera device that photographs the image displayed on the display unit and the actual object placed on the display unit or near it, and the information processor with the processor connected to the display unit and camera device.

Advantages of the invention are also achieved in part by recognizing a user gesture for holding or releasing the image or actual object displayed on the above-mentioned display surface in a gesture recognition method. This function is achieved in the information processor which provides the method for recognizing the hand gesture of the operator from the image input from the camera device and operates the image on the display surface according to the result of this gesture recognition method.

Assume that a facsimile is placed on a desk as an actual object and a data file is opened on the display unit as an image. When the operator moves this data file in the facsimile direction to be placed within a given distance, the information processor performs facsimile send processing on the assumption that the data file is sent in the facsimile. This enables not only an actual object to be used in the man-machine interface but also an instinctive operating environment to be established. In addition, the operator can directly handle an object in a sense of holding by recognizing the image or actual object hold and release gestures as the hand gesture of the operator without specifying a menu and an icon. The man-machine interface is thus remarkably improved.

According to certain preferred embodiments of the present invention, a system is provided for implementing the interactive operator use of objects to retrieve, read, change and file electronically stored information. The system includes a display device, a file storage means for storing electronic information, a discrimination means for discriminating an object indicated by a user, and a link storage means for storing link information which designates the correspondence between the aforementioned object and the electronic information stored in the aforementioned file storage means. A file operation means is provided for reading the electronic information corresponding to the discrimination result of the object by the discrimination means from the file storage means on the basis of the link information and for displaying it on the display device. A link definition means is provided for generating link information or displaying the electronic information corresponding to the discrimination result of the object on the display device, displaying the discrimination result of the object by the discrimination means and the electronic information stored in the file storage means, and designating the correspondence between the selected electronic information among the displayed electronic information and the discrimination result. An attribute discrimination means is provided for displaying the electronic information corresponding to the discrimination result of the object on the display device and discriminating the attribute information added to the object, and a file operation means is provided for executing the Operation on the basis of the discriminated attribute information for the electronic information having the correspondence with the discriminated object.

According to a first characteristic of embodiments of the present invention with a link storage means, electronic information corresponding to the discrimination result of an object by the object discrimination means is read from the file storage means by the file storage means on the basis of the link information stored in the link storage means a displayed on the display device, so that a user can access the electronic information intuitively using the correspondence between the object and electronic information.

According to a second characteristic of the embodiments of the present invention with a link storage means, the discrimination result of an object by the object discrimination means and the electronic information stored in the file storage means are displayed by the link definition means and link information for designating the correspondence between the selected electronic information among the displayed electronic information and the discrimination result of the object is generated, so that a user can generate link information interactively on the screen.

According to a third characteristic of embodiments of the present invention with a link storage means, the attribute information added to an object is discriminated by the attribute discrimination means and the operation on the basis of the discriminated attribute information is executed for the electronic information having the correspondence with the discriminated object by the file operation means. Namely, it is controlled so that unsuitable processing cannot be executed for the electronic information corresponding to the object according to the attribute information including the information for designating whether the electronic information corresponding to the object is allowed to be modified or not, so that it can be avoided that information is erased due to an incorrect operation by a user.

Other objects, advantages and novel features of the present invention will become apparent from the following detailed description of the invention when considered in conjunction with the accompanying drawings.

BRIEF DESCRIPTION OF THE DRAWINGS

FIG. 32 is a drawing showing an example of button display for instructing start of changing of the link by a user with the system of FIG. 26;

FIG. 33 is a drawing showing an example of the interactive screen for editing a link by a user with the system of FIG. 26;

FIG. 34 is a drawing showing an example of button display for instructing to make the displayed document correspond to an object with the system of FIG. 26;

DETAILED DESCRIPTION OF THE DRAWINGS

A preferred embodiment of this invention is explained in conjunction with FIGS. 1 to 24. In the example shown, the device that photographs an actual object or an image is assumed to be the camera installed to view the horizontal planar or plane display unit. The horizontal-plane display unit can also be used as a half mirror to facilitate photographing an actual object or an image from the inside of the display unit. Alternatively, the hand gesture of the operator can be recognized by installing camera elements such as a CCD sensor in the display unit itself. In the illustrated embodiment, document processing in an office is explained as the application field. It is also contemplated that the information processing system could be applied to a process control field, an education field, a medical field, and a game field.

Figure 1:
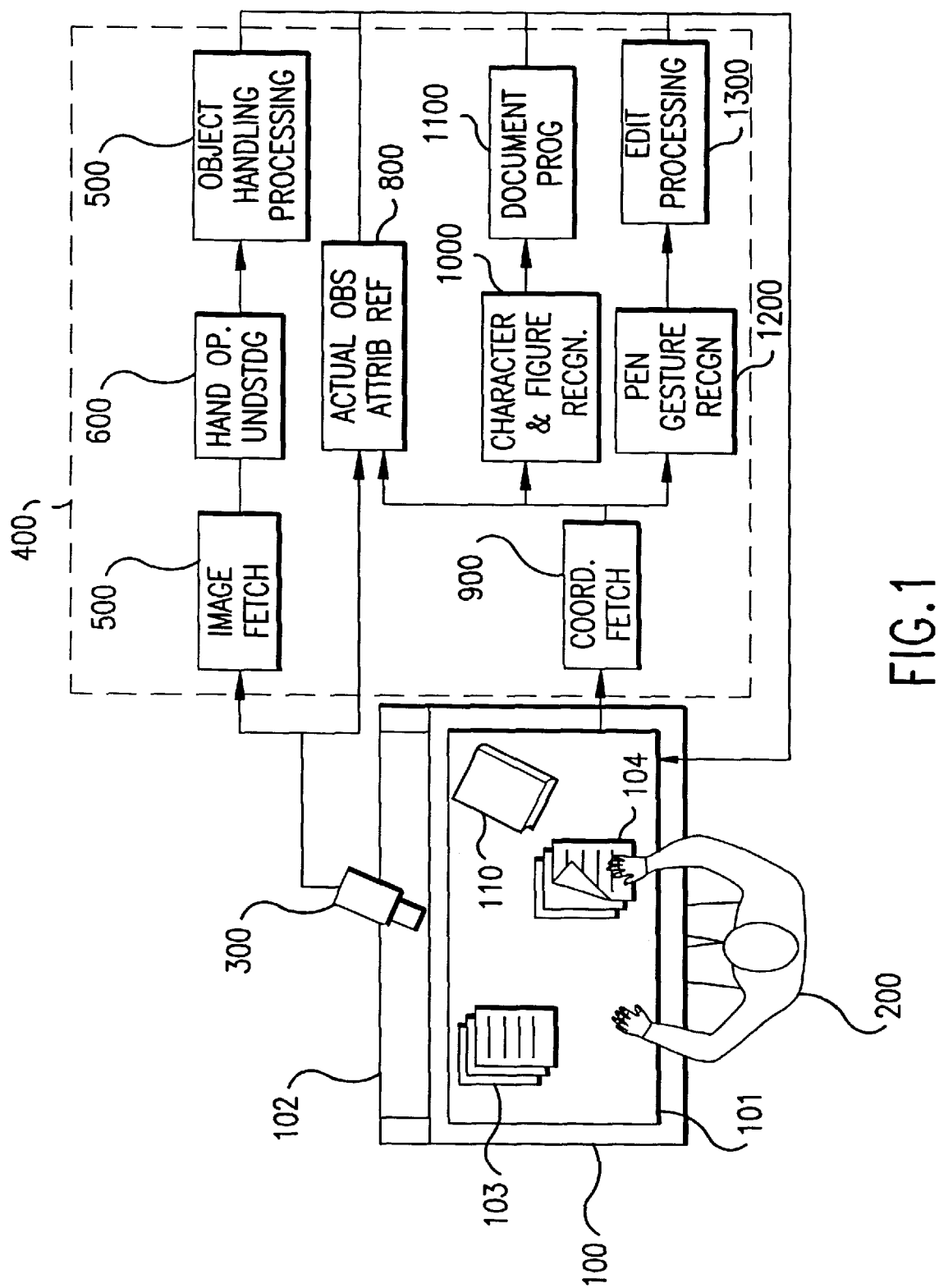
FIG. 1 is a schematic block diagram showing the information processor functions of preferred embodiments of the present invention.

First, the general outline of the preferred embodiment is explained below. FIG. 1 is a schematic block diagram depicting the information processor system functions. An entire desk cabinet 100 includes a horizontally-installed plane display 101 and a vertically-installed front display 102 united together. The sizes of each of these two displays (101 and 102) are about 40 inches in length and about 40 inches in width or height. Displays 101 and 102 can display A4-size documents such as 103 and 104 depicted in the actual size relative to the total display area. An operator 200 is depicted at one side of the desk unit 100. An overhead camera 300 monitors the hand movement of the operator with respect to the documents 103 and 104 and the file 110, which is an actual object placed on the desk. Although it is not illustrated in FIG. 1, coordinate input unit TB is laminated on the plane display 101. The configuration of this unit is the same as that of the known pen computer. Although the referenced embodiment described include such a laminated on coordination input unit, other systems could be used that would also locate the physical objects.

Of the two displays 101 and 102, horizontal plane display 101 uses stylus pen 109 to input and edit objects and also uses handling of a display object. Front display 102 is used to display the interrupted and pending jobs and bulletin board information such as a schematic drawing and a telephone number. Front display 102 is also used to display the screen used when data is input from a keyboard. In this illustrated embodiment, no coordinate input unit is laminated on the front display 102. If pointing is necessary, define and use an area for front display 102 in a part of plane display 101 or use the mouse device as usual.

Referring to FIG. 1, block 400 is a processor (computer) that realizes functions. The image monitored by overhead camera 300 is fetched by image fetcher 500, processed by hand operation understanding unit 600 where an actual object and the hand gesture are recognized. The recognition result is processed by object handling processing unit 700. Object handling processing unit 700 operates according to the correspondence between the actual objects and images defined in attribute definition processing unit of block 800. Concretely, unit 800 moves and rotates the displayed object (image). Unit 800 also performs external device interface (file, facsimile, and mail, etc.) processing and page handling processing such as page opening and page layout. The processing result of object handling processing unit 700 is displayed on plane display 101.

Objects are mainly input and edited by blocks 900 to 1300. The coordinate of stylus pen 109 is fetched by coordinate fetcher unit 900 as the output of coordinate input unit TB laminated on plane display 101. Use of the pen coordinate depends on the menu mode. When the menu mode is the input mode, the pen coordinate becomes data for character and figure recognition. When the menu mode is the editing mode, the pen coordinate becomes data for pen gesture recognition block 1200.

The recognition result of character and figure recognition unit 1000 is input to document processing unit 1100 for document creation. When editing is necessary, the documents created by the pen gesture command can also be edited by editing processing unit 1300.

As explained above, in this illustrated embodiment, the movement of a hand and an actual object are monitored by the overhead camera. An operating environment like the actual desk environment is established because display objects are handled according to the monitoring result.

Figure 2:
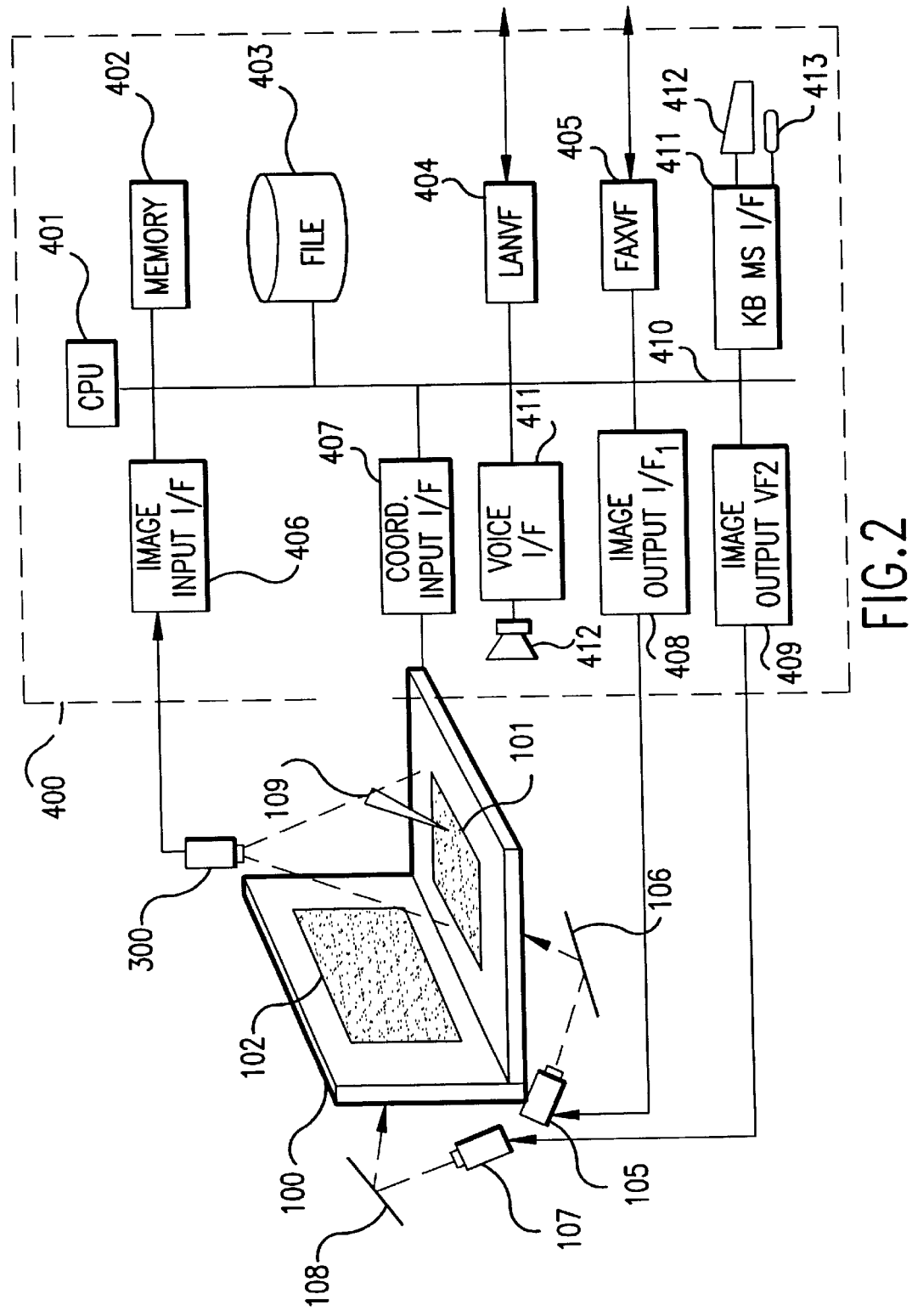
FIG. 2 is a schematic hardware block diagram of the information processor system in accordance with a preferred embodiments of the present invention as depicted in FIG. 1.

FIG. 2 is the hardware block diagram of the information processor system according to the preferred embodiment of the invention. In this embodiment, plane horizontal display 101, front display 102, projectors 105 and 107, and mirrors 106 and 108 comprise a large screen display arrangement.

The image to plane display 101 is output from image output I/F1 408 of processor 400 and supplied to projector 105. The light of projector 105 is reflected on mirror 106 to be imaged to the translucent screen (ground glass, etc.) of plane display 101. Likewise, the image to front display 102 is imaged to the translucent screen of front display 102 via image output I/F2 409, projector 107, and mirror 108. In the shown embodiment, the method for projecting light from the rear to the screen is used. The method for projecting light from the front may also be used. The method for projecting light from the front, however, causes contrast to be influenced by peripheral illumination; it also causes the shadow of an obstacle on an optical path to be reflected on the screen.

The image monitored by overhead camera 300 is fetched into image input I/F 406, then stored in memory 402. Data in memory 402 is processed by CPU 401 and the result is output from projectors 105 and 107 by image output I/F1 408 or image output I/F2 409 as an image.

An effective sound is output from speaker 412 via voice I/F 411. In addition, coordinate data for the coordinate input unit (not illustrated in the figure) is used for pen input. Like general personal computers and workstations, file 403, KB.SI/F411, device KB412.MS413, and communication interfaces LANI/F 404 and FAXI/F 405 are connected to CPU 401. Communication interface LANI/F 404 is used to execute the network function and communication interface FAXI/F 405 used to communicate with a facsimile via a telephone line.

The illustrated embodiment of this invention is characterized in that (1) the environment in which an image object can be handled in a sense of direct touch and (2) the environment in which actual objects can be used as man-machine interface parts are established. The method for realizing these characteristics is explained based on attribute definition function for actual objects at unit 800, which is a characteristic function of the preferred embodiment of this invention, hand operation understanding at unit 600, and object handling processing at unit 700. FIGS. 3 to 14 are referred to below in explaining these functions and operations.

Figure 3A:
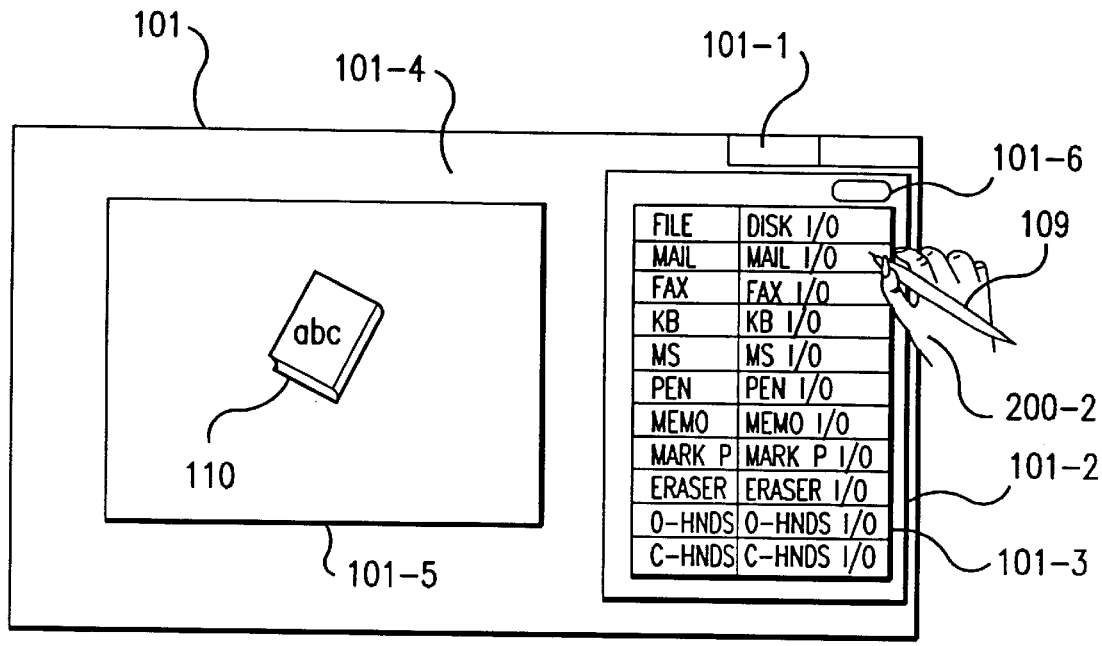
FIGS. 3a and 3b depict the screen used to define the attributes of the actual objects to be processed in the information processor shown in FIG. 1.
Figure 3B:
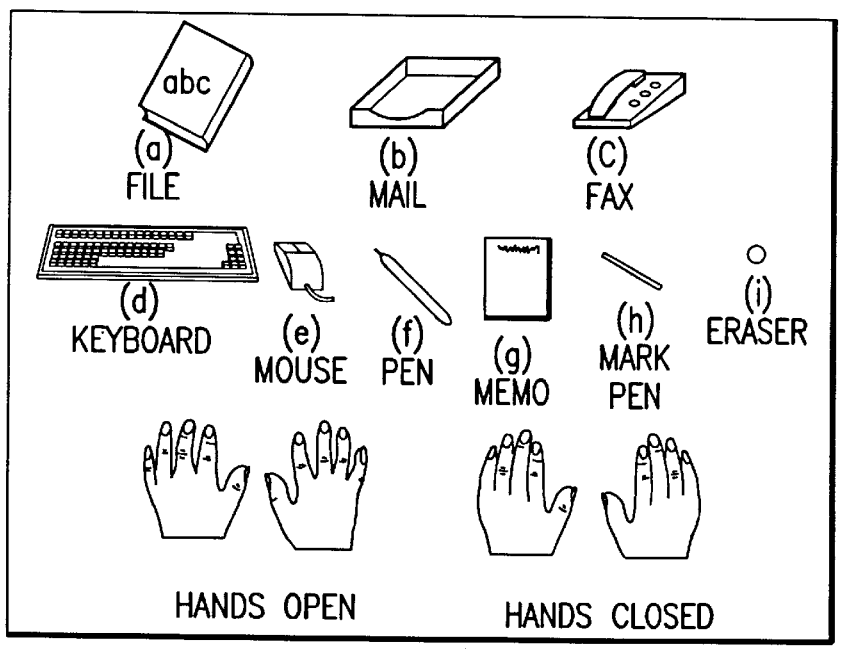

Actual object attribute definition is schematically depicted in FIGS. 3 (*a*) and 3 (*b*). To enable direct touch of image objects and use of actual objects as man-machine interface parts, the attributes of the actual objects must be defined so that the processor can understand what they mean. Concretely, actual objects are projected and a table is created indicating the correspondence between the characteristic amount data and operations. FIG. 3 (*a*) shows the operation screen used to define the attributes of these actual objects. This definition needs to be done once in advance.

For this definition, first hit operation/definition menu 101-1 with is stylus pen 109 to set the definition mode. When attribute definition menu 101-2 is displayed, hit menu 101-3 to be defined this time with stylus pen 109. When this hitting terminates, area 101-5 in which actual objects are placed is displayed in the center of the screen and guidance 101-4 is displayed. When the object to be associated (in this example, file 110) is placed in this area within a given time (for example, 2 minutes (the remaining time is displayed like a sand), processing is terminated and area 101-5 and guidance 101-4 are erased. To terminate the definition, hit end 101-6 in the attribute definition menu with stylus pen 109. When the definition terminates, the 101-1 mode automatically changes to the operation mode.

FIG. 3 (*b*) is an example of the actual objects to be processed. Actual objects are associated with operation definitions as follows: (a) File part DESK I/O operation, (b) MAIL part—MAIL I/O operation, (c) FAX part—FAX I/O operation, (d) KB part—KB input operation, (e) MS part—MS input operation, (f) PEN part—PEN input operation, (g) Memo part—Image pasting operation, (h) Marker pen part—Image composition operation, (i) Eraser part—Image erase operation, (j) Opened hand part—Release operation, and (k) Closed hand part—Hold operation. As a result of this attribute definition, the table indicating the correspondence between characteristic amount data for each recognition and operations is created. When a file is recognized, for example, it is associated with DESK I/O operation. When the displayed object overlaps a file part, it is stored in the desk. Conversely, when the file part is touched (hold operation), the documents in the file are opened.

The basic concept of the hand gesture operation and object handling is explained below. The basic concept of the hand gesture operation and object handling in the preferred embodiment of this invention is as follows: Here, objects mean the objects to be displayed on a display (also called image objects) and actual objects. For example, they mean the parts to be touched by hand such as a KB, a pen, an eraser, and a facsimile.

(1) Hand Gesture Operation For Image Object Handling (a) One handed—pressing an image object one-handed is associated with the layout of the entire image object and I/O access processing. This method is actually a general method because documents on a desk are handled one-handed in many cases. Layout processing includes the movement and rotation of image objects. I/O access processing includes access to auxiliary storage (auxiliary memory) files and access to an external network (MAIL and facsimile that use LAN), etc.

(b) Two handed—pressing an image object with both hands is associated with image object handling (valid when there are two or more pages). This method is actually a general method when the fact that document page opening and separation on a desk are performed while pages are being held down with both hands in many cases is considered. Page handling includes page layouts such as page opening, take-out and insertion of specified pages, page separation, page collection, and page replacement.

(c) Hand gestures—The hand gesture operation includes the following five operations: (i) image object holding, (ii) image object releasing, (iii) movement with holding, (iv) wrist rotation with holding, and (v) thumb swing with holding. Movement with holding in (iii) is associated with image object movement (holding one-handed) and page layout (holding with both hands).

Wrist rotation with holding in (iv) is associated with the rotation of the entire image object (holding with one-handed) and the degree of page opening (holding with both hands). Thumb swing with holding in (v) is associated with page opening (holding with both hands).

(2) Actual Object Handling

Actual object handling involves how to use an actual object as a man-machine interface part. Instinctive interaction with the computer is enabled by fetching an actual object from the camera device and an image, recognizing the object, and using it as a man-machine interface part.

In actual object handling, two cases (a) and (b) may occur. In (a), the characteristic point coordinate of an image object approaches that: of an actual object or vice versa (overlap). In (b), the characteristic point coordinates of two actual objects approach (overlap). The former example means that When the characteristic point coordinate of a document display object approaches that of a file, MAIL, or FAX part, the document is transferred to each part. The latter example means that when the characteristic point coordinate of an actual object (file, MAIL, or FAX part) approaches that of the hand and hold operation is being performed, the display object defined in the part is opened. The latter example also means that when the KB, MS, PEN, memo, marker pen, and eraser parts in FIG. 3 (a) approach their characteristic point coordinates, they are input to the display object. The gravity center, center, corner, and endpoint of the display object can be used as characteristic point coordinates.

When handling an image object or an actual object, hold and release operations are particularly important in the hand gesture operation. That is, unless object holding or release is detected, touching an object only causes the operation to be started. In a mouse, this operation is performed by clicking the mouse switch. Turning the mouse switch on/off is also considered one possible method. This method, however, causes operation efficiency to deteriorate. For this reason, it is desirable that the hand gesture operation be naturally detected in an image.

Figure 4A:
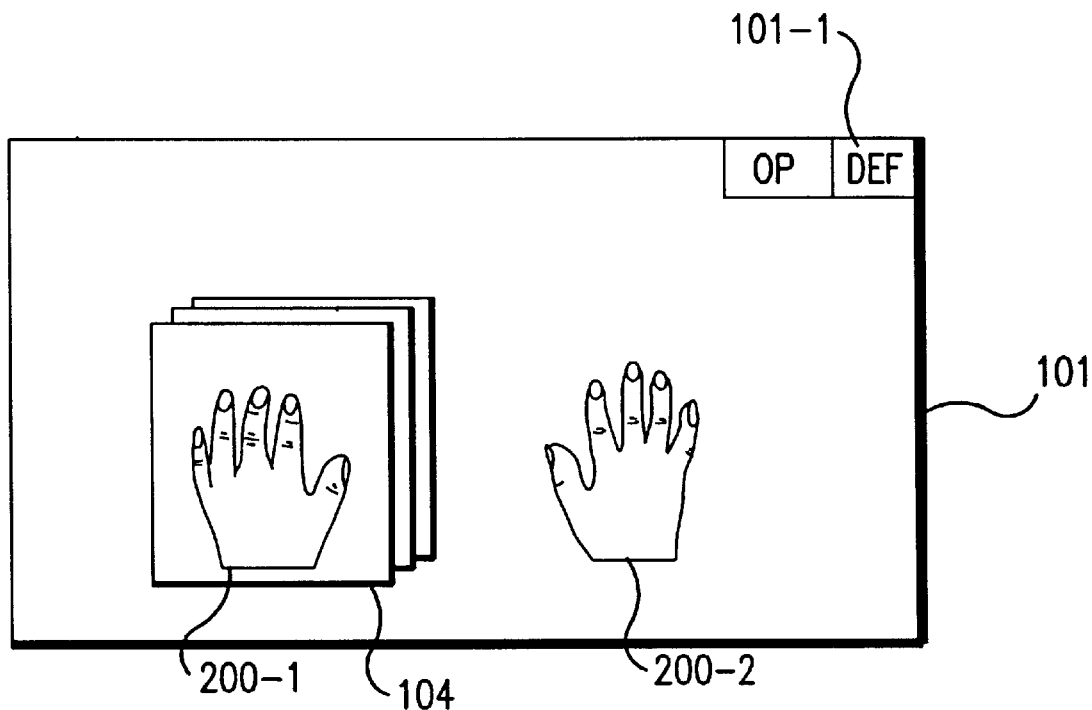
FIGS. 4a and 4b schematically depict the method for judging the hand hold and release operations used with the information processor shown in FIG. 1.
Figure 4B:
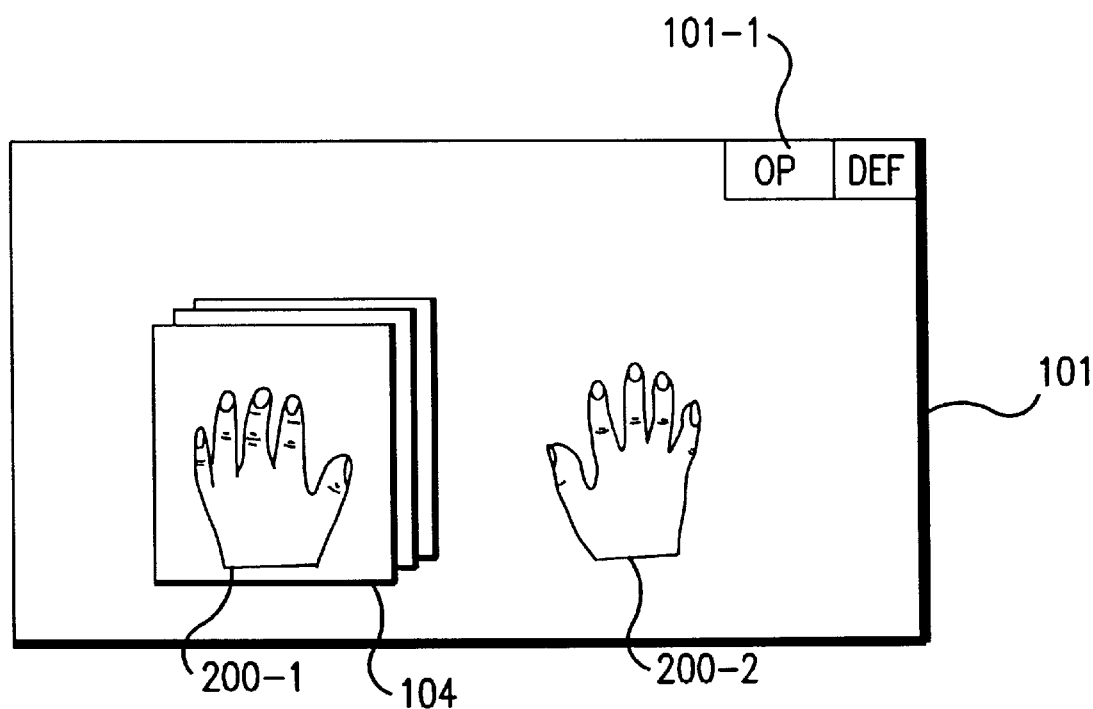
Figure 5A:
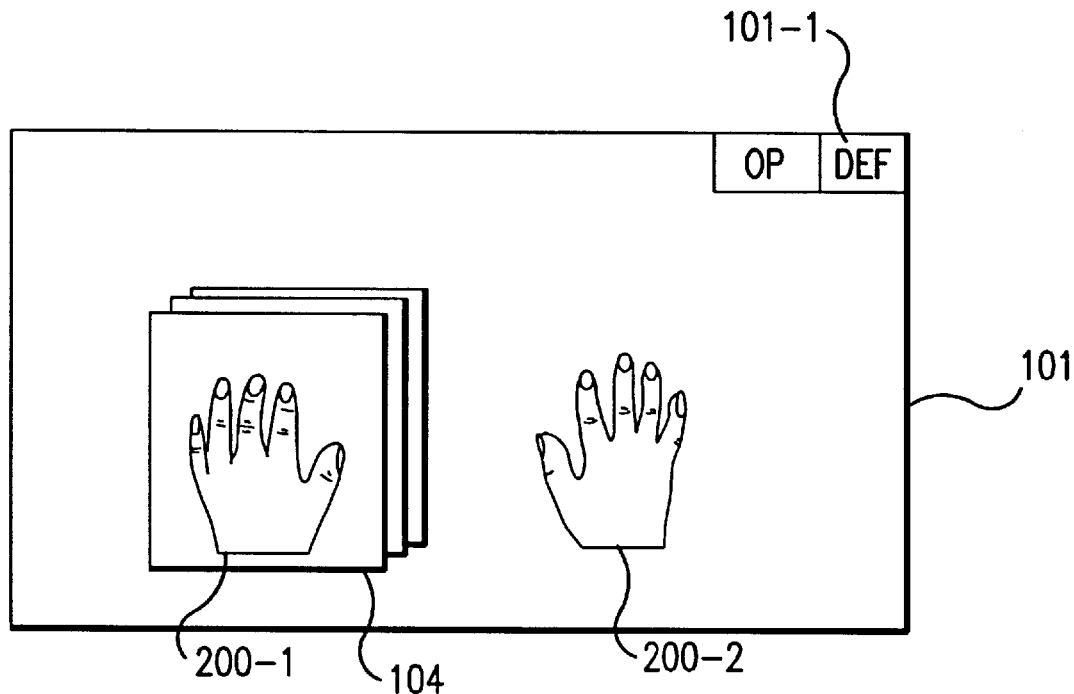
FIGS. 5a and 5b schematically depict other methods for judging the hand hold and release operations used with the information processor shown in FIG. 1.
Figure 5B:
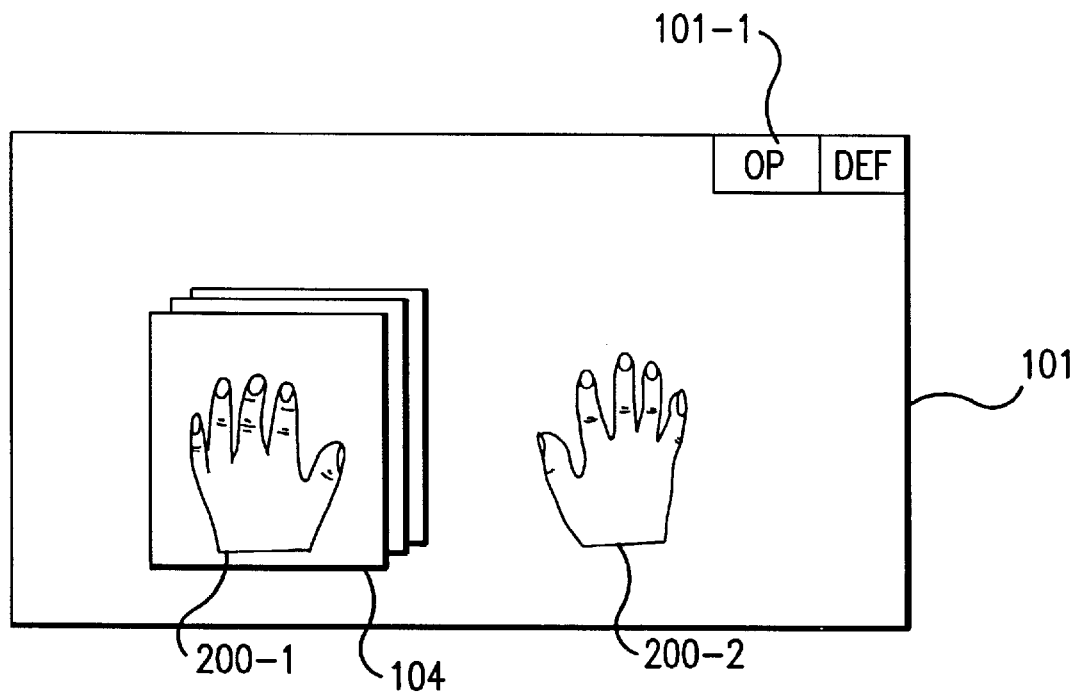

In FIGS. 4 and 5, two methods are explained. In FIG. 4 (a), "opened hand" detection (fingers spread) is associated with the release operation. In FIG. 4 (b), "closed hand" detection (fingers together) is associated with the hold operation. When an object is grasped since a hand is usually closed, this gesture operation is easy to understand. As shown in FIG. 5, the other method uses the characteristic that the image size changes according to the upward and downward movements of a hand when the camera device photographs an actual object from above. In FIG. 5 (a), since the hand size is larger than that in FIG. 5 (b), the release operation is depicted in FIG. 5 (a) and the hold operation in FIG. 5 (b). Since this method uses size information, however, an error may occur if a person different from the first defined person uses the information.

In FIGS. 4 and 5, the image object hold and release method is explained. Actual parts can also be detected in the same method. Whether the hold operation is really effective depends on the object to be operated existing in the hand characteristic point coordinate. That is, the hold operation is effective only when the hand characteristic point coordinate exists in the area where the object to be operated also exists. Otherwise, the gesture operation is invalid.

The hold and release operations are explained in conjunction with the closed/opened hand gestures below.

Concrete operation examples based on the above described concepts follow.

(1) Layout Operation

Figure 6A:
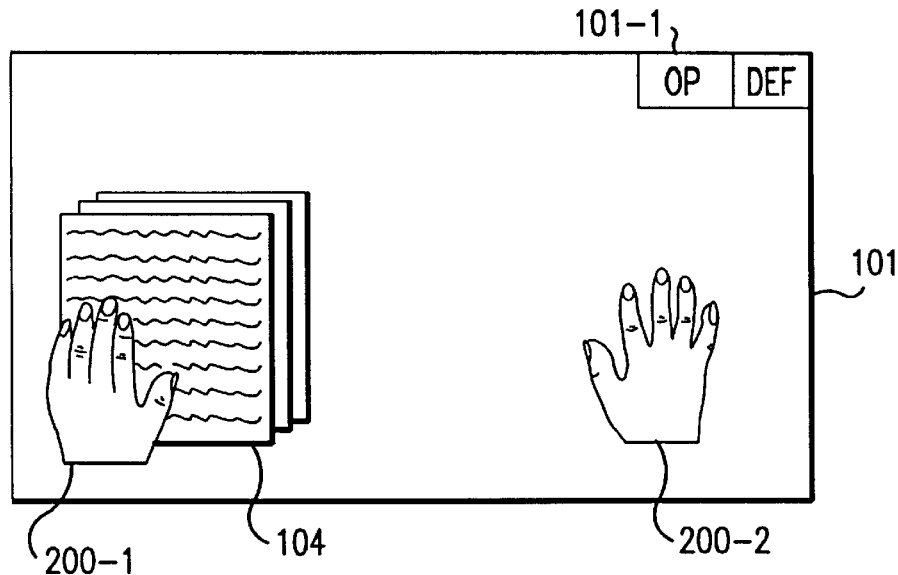
FIGS. 6a–6c schematically depict the movement and rotation of objects to be displayed in accordance with preferred embodiments of the present invention.
Figure 6B:
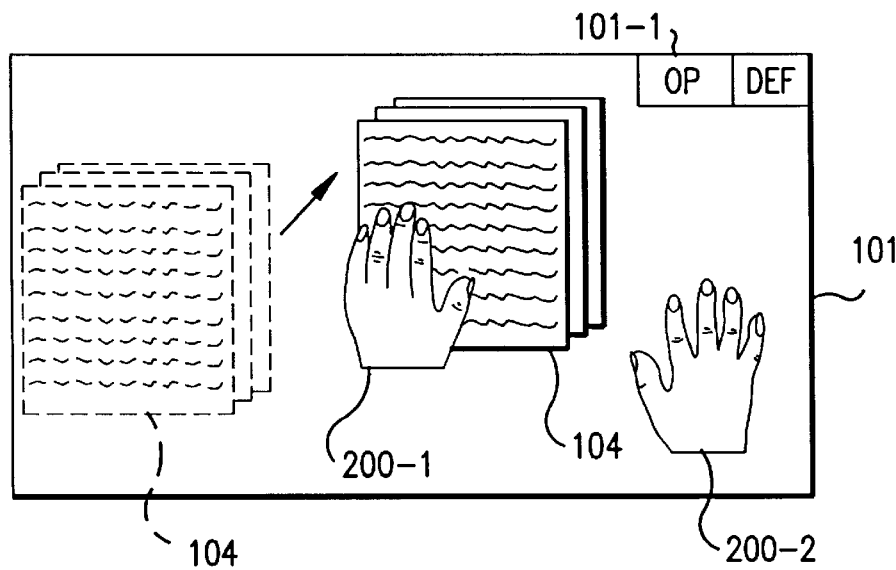
Figure 6C:
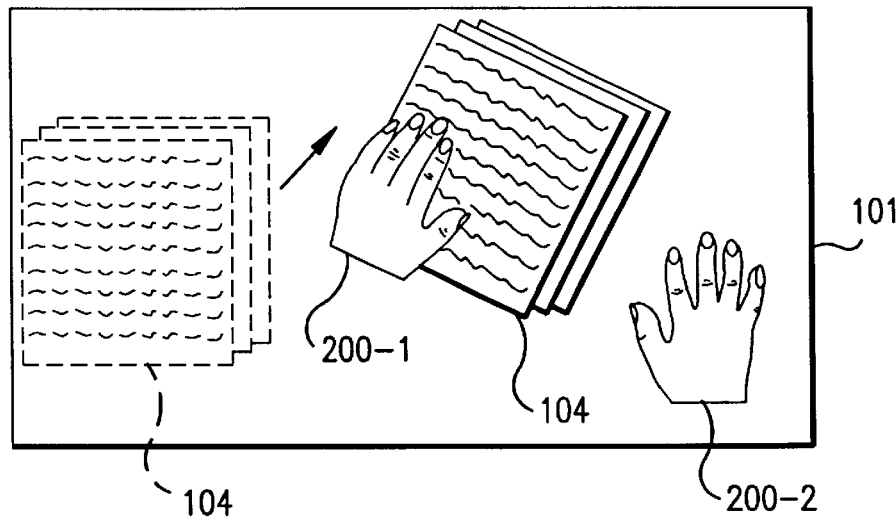

The movement and rotation of an image object are explained in FIG. 6.

FIG. 6 (a) shows that image object 104 is being held by left hand 200-1. Since right hand 200-2 is not holding image object 104 in FIG. 6 (a), this gesture operation is judged as the one-handed operation based on the above basic concept. In FIG. 6 (b), the gesture operation is judged as the movement of the entire object (104', 104). In FIG. 6 (c), since wrist rotation is detected, the gesture operation is judged as the rotation of the entire object (104', 104). The wrist rotation detection method is explained in "Page Opening" to be explained later.

(2) Filing Operation

Figure 7A:
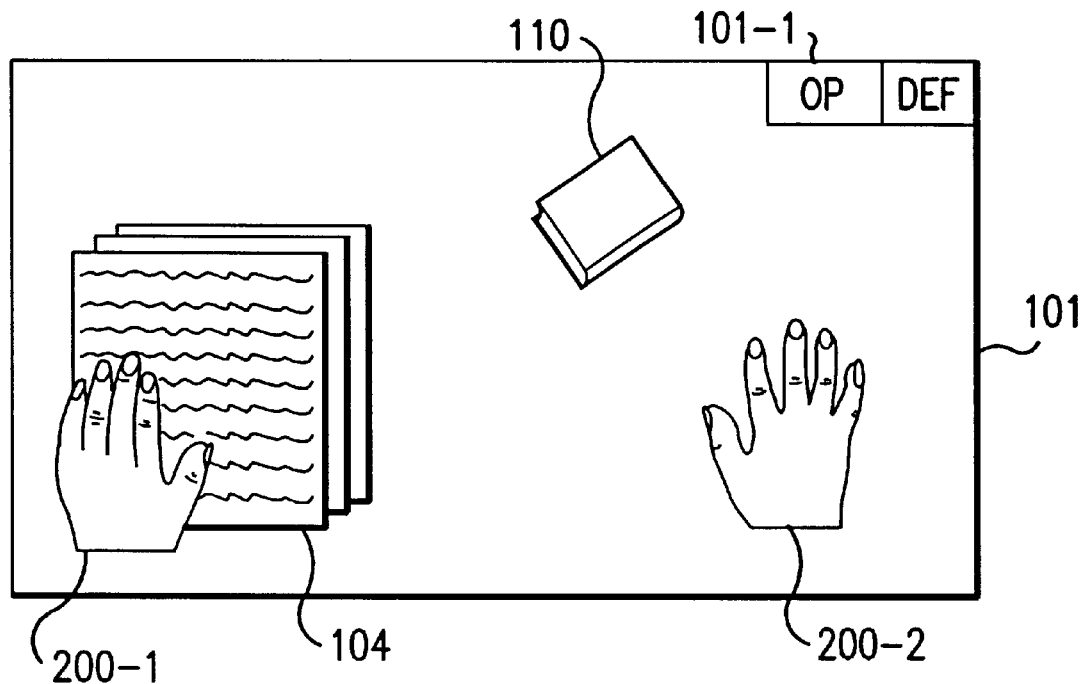
FIGS. 7a and 7b schematically depict the filing of the objects to be displayed in accordance with preferred embodiments of the present invention.
Figure 7B:
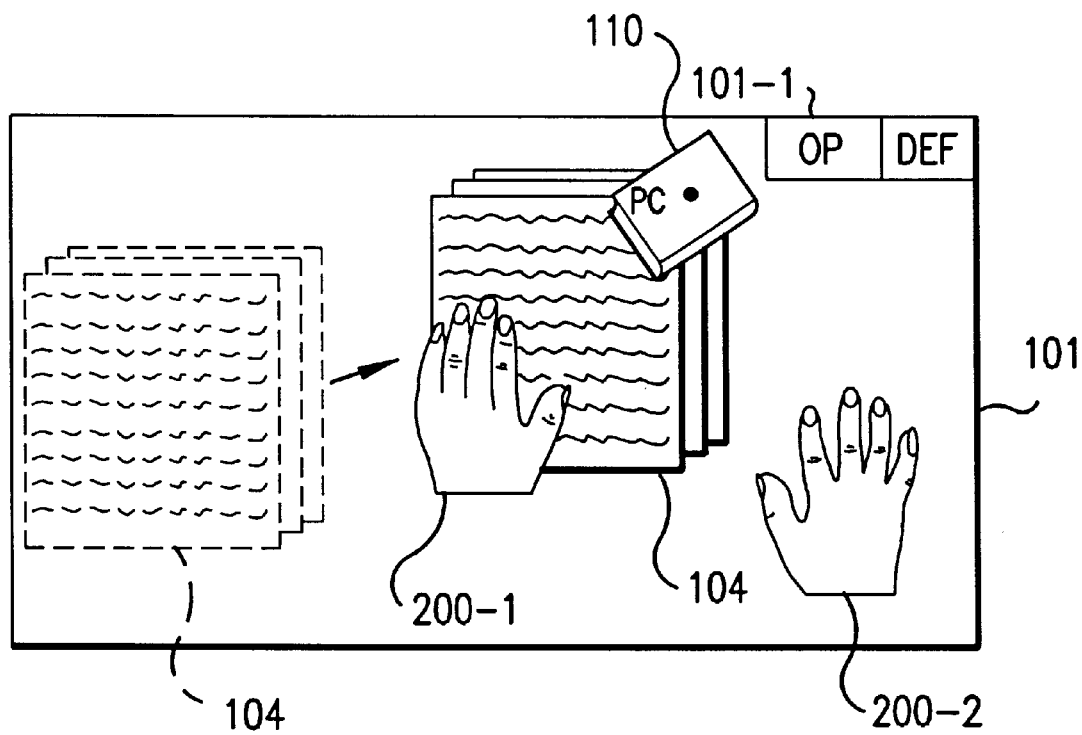

Image object filing is explained in FIG. 7.

Like FIG. 6, FIG. 7 (a) is judged as the one-handed gesture operation.

If a hand is moved while image object 104 is being held, as shown in FIG. 7 (b), image object 104 also moves accordingly (104', 104). However, when the characteristic point (corner or center of gravity) of image object 104 approaches characteristic Point Pc (center of gravity) of file part 110, which is an actual object, image object 104 is highlighted and the file operation acceptance action is displayed. When the release gesture operation of image object 104 is performed here, the file operation is executed and image object 104 disappears.

The illustration is omitted but when the hold gesture operation is applied to file part 110, the associated object is opened. Repeating this operation opens the filed objects one after another on the display.

(3) Facsimile Transfer Operation

Figure 8A:
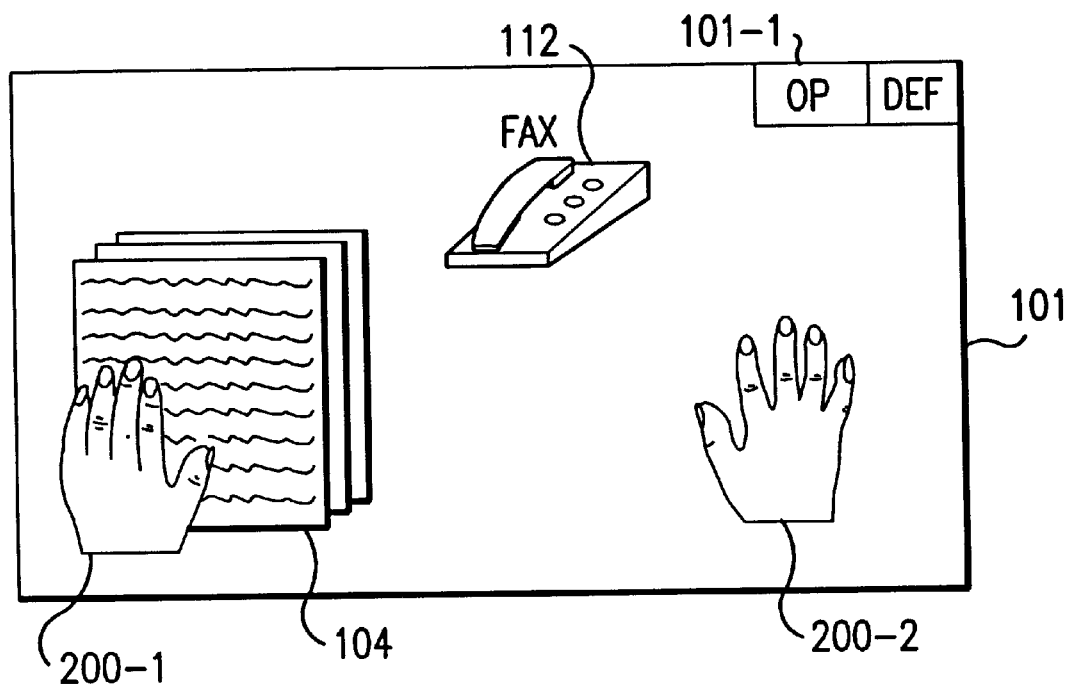
FIGS. 8a and 8b schematically depict the transfer of the objects to be displayed by a facsimile in accordance with preferred embodiments of the present invention.
Figure 8B:
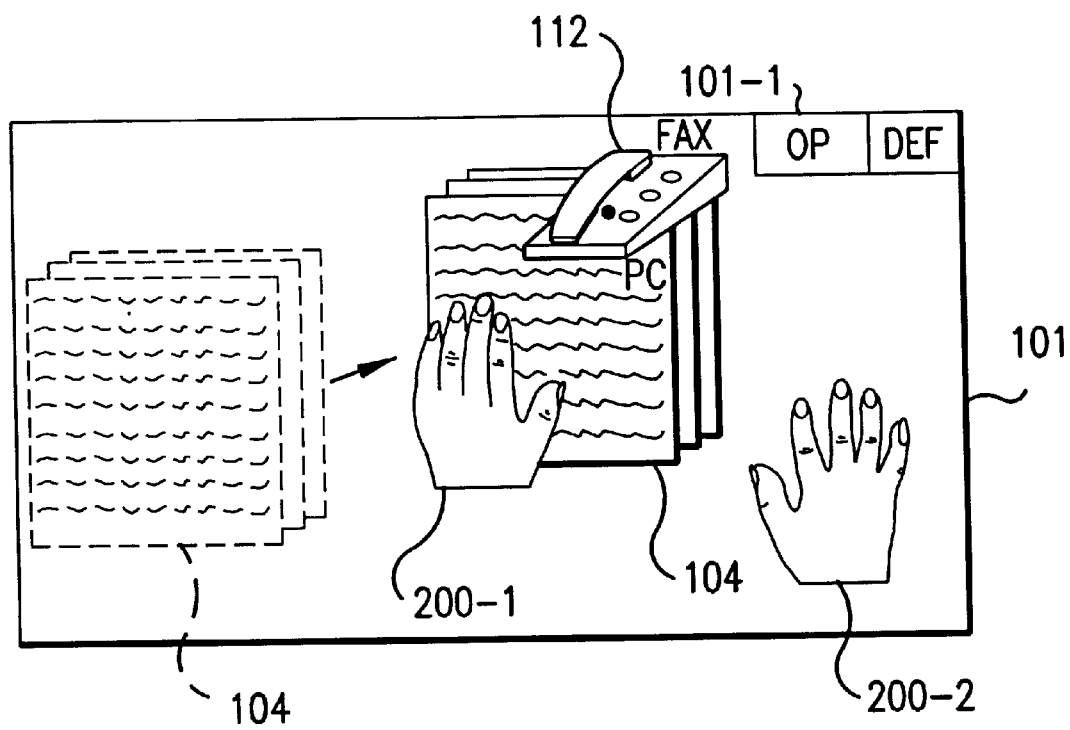

Transfer of the object to be displayed by a facsimile is explained in FIG. 8. Also in FIG. 8 (a), the facsimile transfer operation is judged as the one-handed operation as in FIG. 6. Here, the facsimile transmission destination is assumed to have been defined in advance. As in FIG. 7, when an image object is moved to facsimile part 112, image object 104 is highlighted to notify the operator of the reception. When the image object release gesture is performed here, the image object is automatically dialed and transmitted to the transmission destination. Conversely, the received facsimile document can be opened by applying the hold gesture operation to facsimile part 110.

Figure 25A:
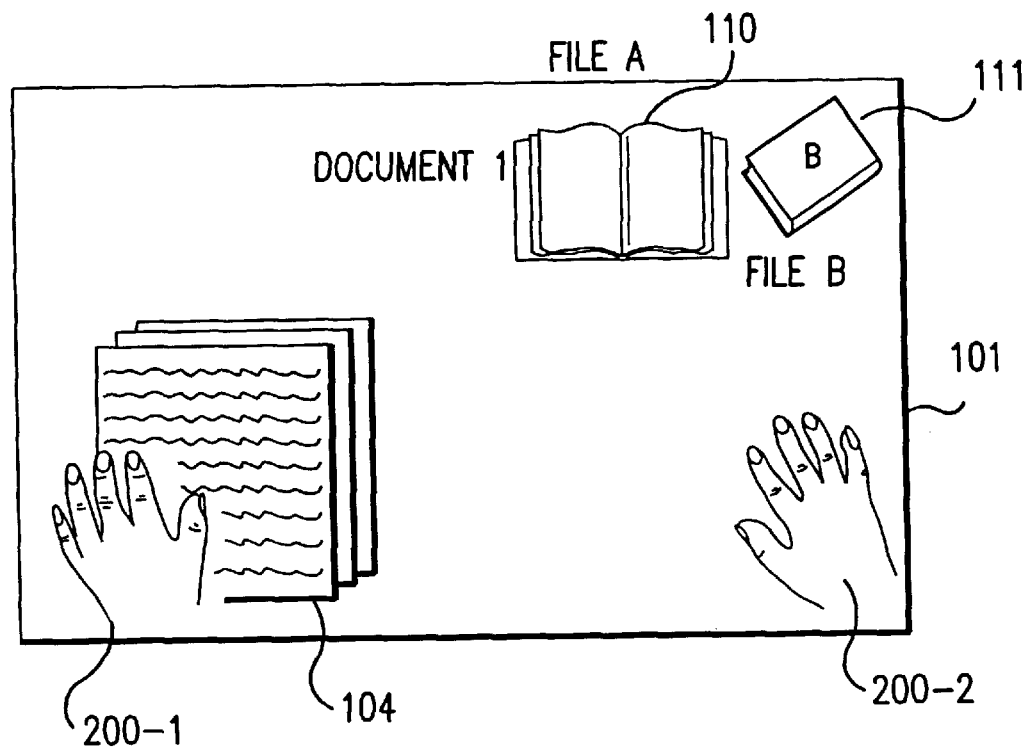
FIGS. 25a and 25b schematically depict the filing method according to a preferred embodiment of the present invention.
Figure 25B:
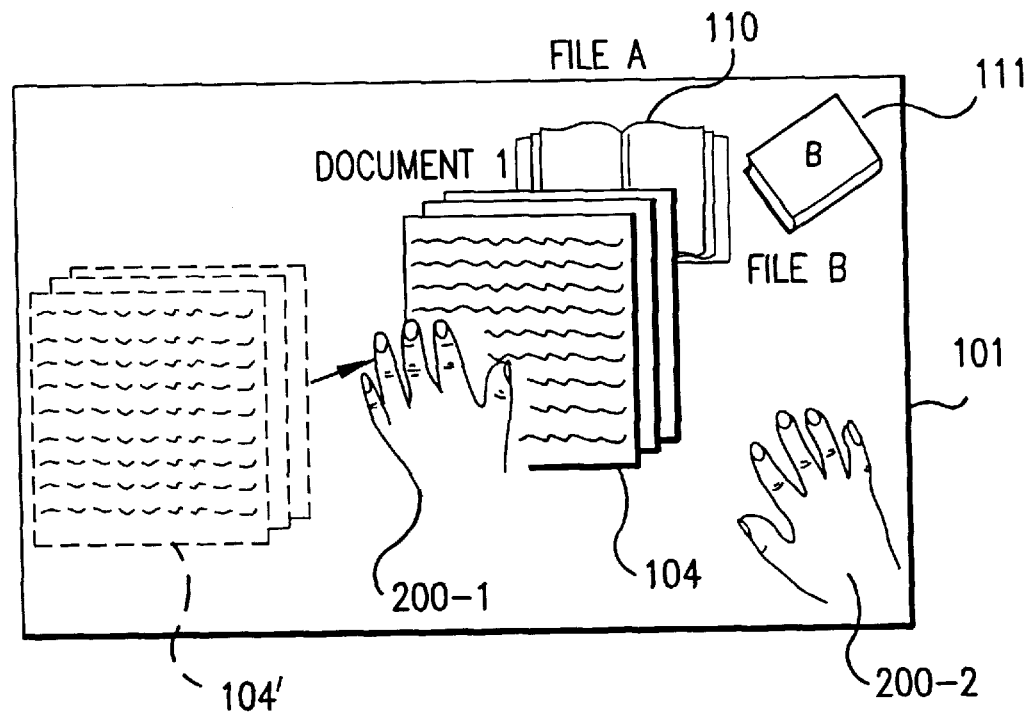

As explained above, operation efficiency is extremely improved because image object layout, filing, and facsimile operation can be instinctly performed. In the above-mentioned examples, file part 110 and facsimile part 112 are actual parts, however, the pictographs displayed on display 101 like icons can be used. For example, file pictograph 110 is displayed on plane display 101, as shown in FIG. 25 (a). Document 104 being displayed is filed when 104 is overlapped on pictograph 110 by moving 104 by hand 200-1, as shown in FIG. 25 (b).

(4) Page Handling Operation

Next, examples of page handling operation are explained in conjunction with FIGS. 9 to 13.

(a) Page Opening Operation

FIGS. 9a to 9d schematically depict a page opening operation. As shown in these figures, holding an object with both hands for an image object (hold gesture) is judged as the page handling operation. The subsequent thumb swing gesture to be performed is judged as page opening.

As shown in FIGS. 9 (a) to (d), the page opening location and amount change, depending on left-hand middle finger directions D1 to D4 and middle dent point ye coordinates P1 to P4 between the thumb and index finger. In FIGS. 9 (a) and (b), since directions D1 and D2 are the left upward direction (northwest direction), the page opening location is from the upper right direction to the lower left direction. The lower the middle dent point coordinate is (P1, P2), the higher the degree of page opening will become. In FIGS. 9 (c) and (d), since directions D1 and D2 are the right upward direction (northeast direction), the page opening location is from the lower right direction to the upper left direction. As explained above, direction D and middle dent point coordinate P can be used to freely modify the page opening location and amount.

The page opening direction (forward direction/backward direction) is judged by the thumb swing gesture. In this execution example, if the status in which the thumb and index finger are opened continues for a given time after an image object has been held by hand, the subsequent thumb swing direction is the forward direction. If the status in which the thumb touches the index finger continues for a given time, the subsequent thumb swing direction is the backward direction. The backward direction is changed to the forward direction by canceling the finger swing temporarily and stopping the status in which the thumb and index finger are opened for a given time. The forward direction is changed to the backward direction by stopping the status in which the thumb touches the index finger for a given time. The page opening speed is made proportional to the finger swing speed.

FIGS. 9a–9d depict an example of opening a page by a left hand. This can also be done by a right hand. Which hand is used to open pages is judged according to how much the hand holding a page occupies the object. The first finger swing gesture can be used as another method.

The page opening location and the degree of page opening can also be determined according to the location when an image object is held by both hands (4 corners). In addition, the left-hand finger swing direction can be defined as the forward direction and the right-hand finger swing direction be defined as the backward direction.

Page opening is assumed to be reset when a hand is released from the object.

(b) Page Take-out And Insertion Operations

Figure 10A:
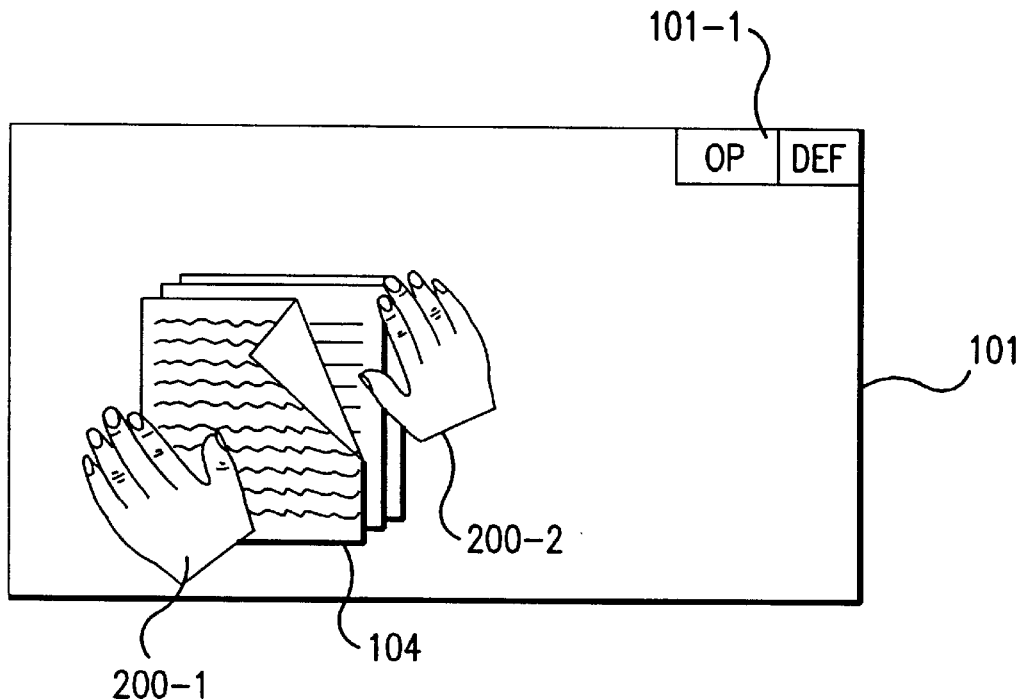
FIGS. 10a and 10b schematically depict take-out and insertion of any pages in accordance with preferred embodiments of the present invention.
Figure 10B:
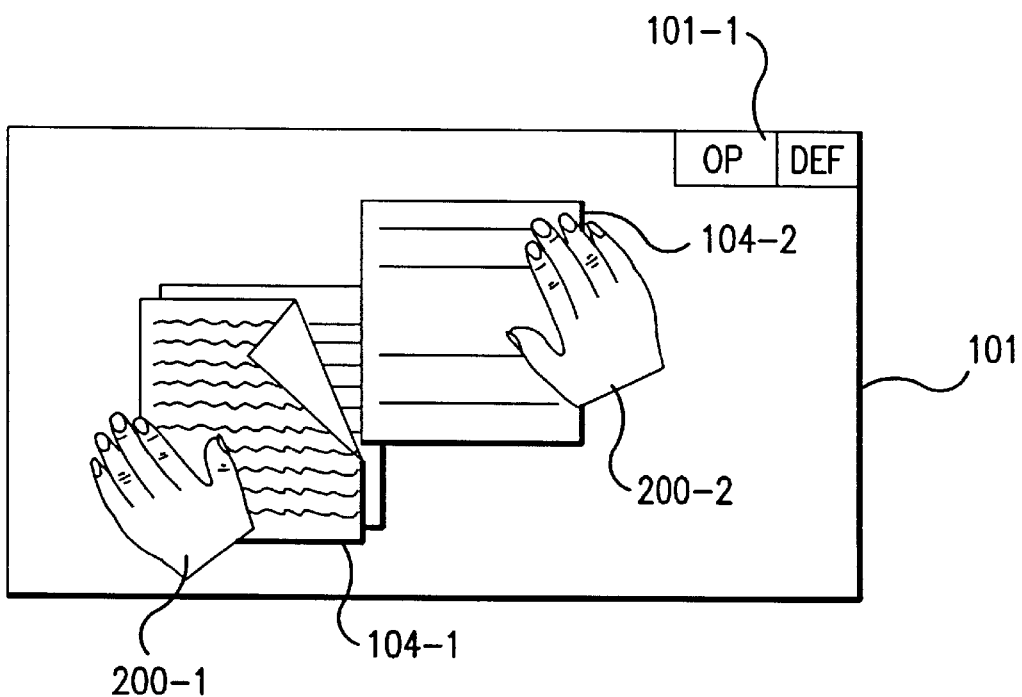

Next, the method for taking out and inserting pages is explained in conjunction with FIGS. 10a and 10b. Page take-out or insertion occurs when a desired page is found during page opening. For this reason, as shown in FIG. 10 (a), only the desired page can be taken out by moving the unused hand during page opening (FIG. 10 (b)) (page take-out). Conversely, the taken-out page can be inserted into the original location by returning the moved hand (page insertion).

(c) Page Separation/Collection Operations

Figure 11A:
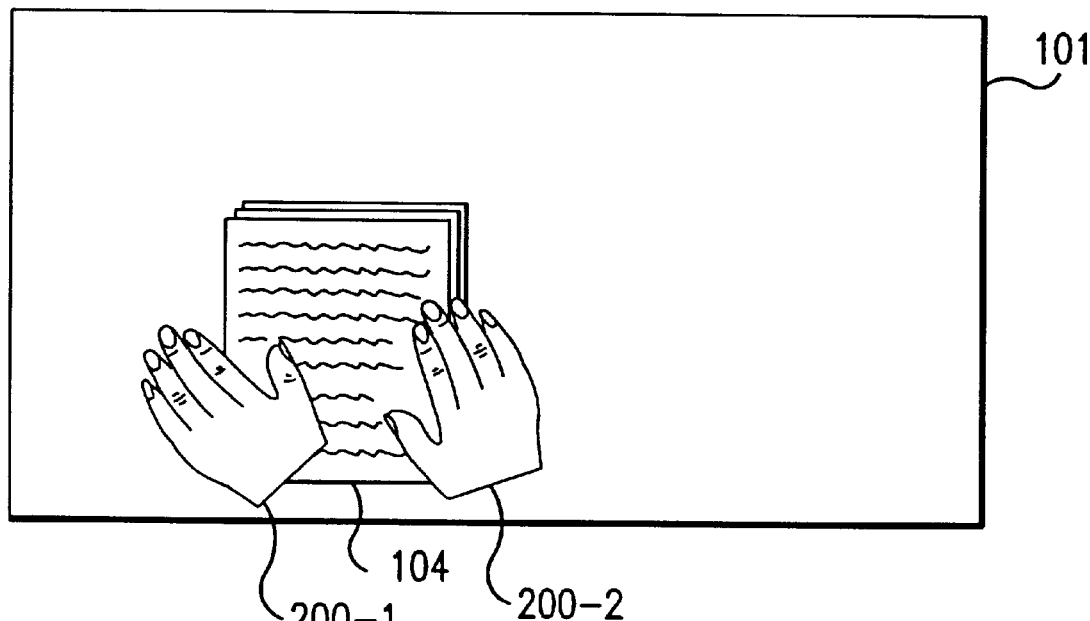
FIGS. 11a and 11b schematically depict document page separation in accordance with preferred embodiments of the present invention.
Figure 11B:
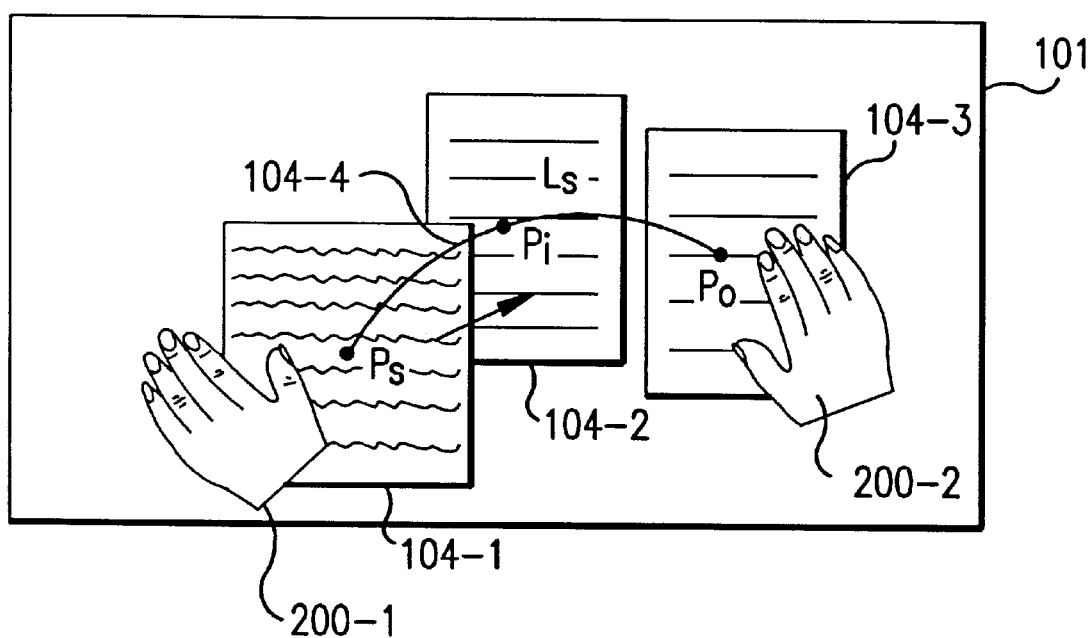
Figure 12A:
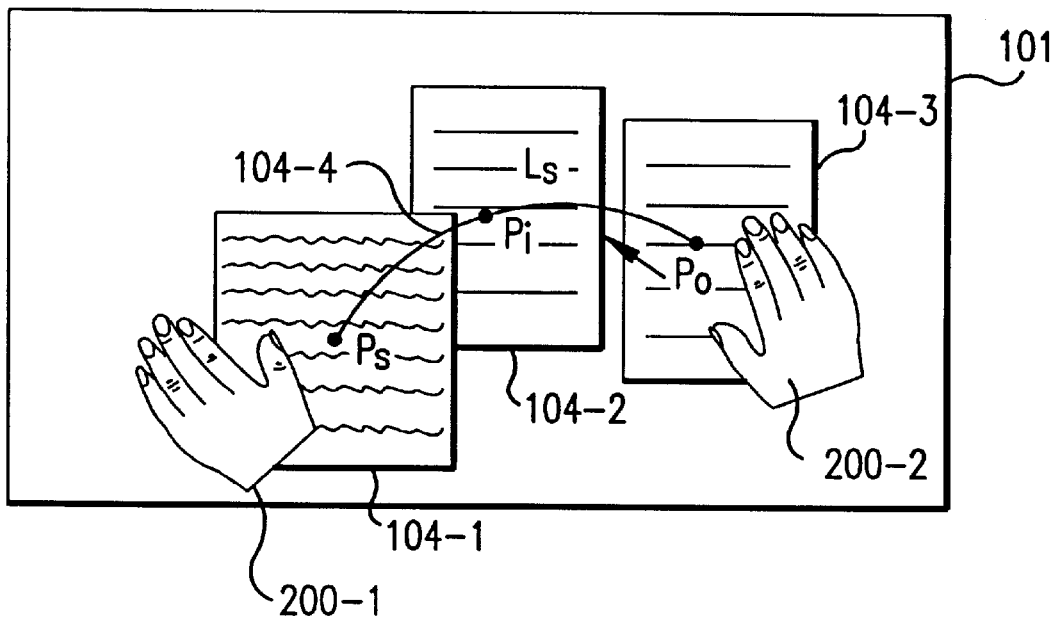
FIGS. 12a and 12b schematically depict document page collection in accordance with preferred embodiments of the present invention.
Figure 12B:
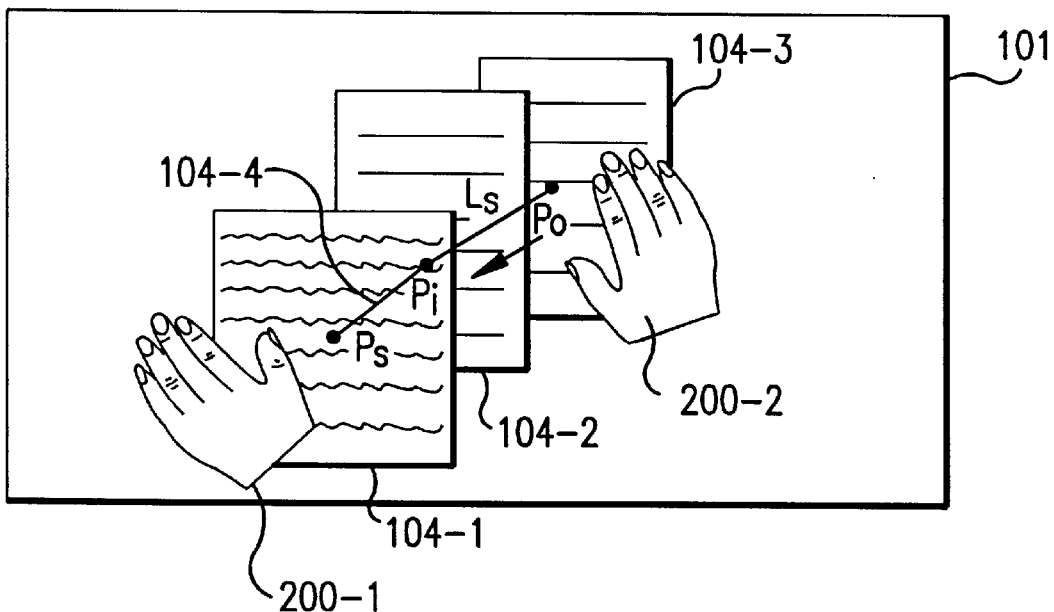
Figure 13A:
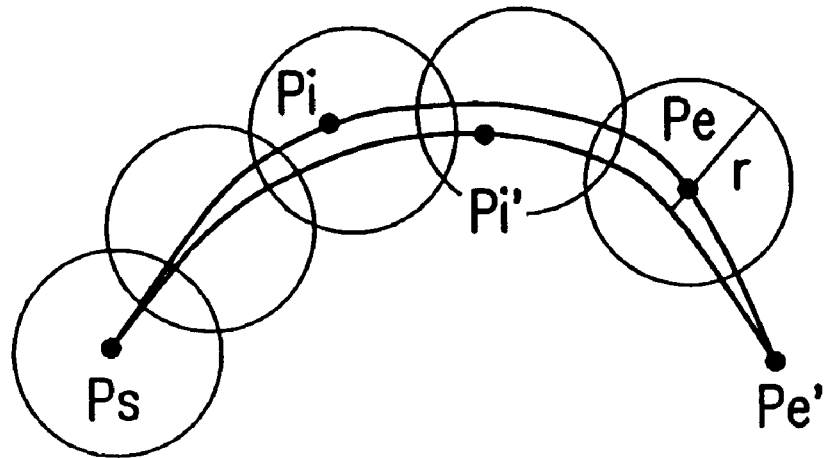
FIGS. 13a and 13b are top schematic views which depict the page separation/collection judgment method in accordance with preferred embodiments of the present invention.
Figure 13B:
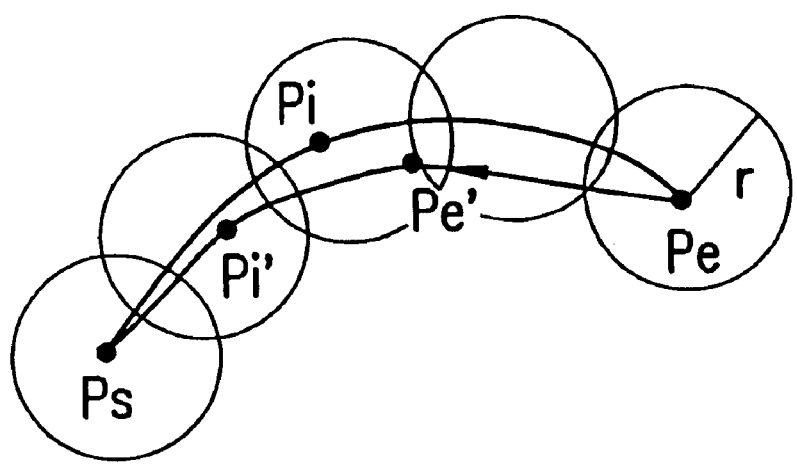

The methods for page separation and collection are explained in FIGS. 11 to 13. When one hand is moved without pages opened, pages are scattered (FIG. 11 (a) and (b)). The page distance is determined from the move distance between two points (Ps to Pe). That is, the shorter the move distance is, the less pages will be piled up. Conversely, the longer the move distance is, the more pages will be piled up. In FIG. 11 (b), the central coordinate of the page being held by the moving hand is supposed to be end point coordinate Pe of the location and the central coordinate of the page being held by the unmoving hand is supposed to be start point coordinate Ps of the location. When there are two or more page document objects, interpolation point coordinate Pi is calculated. Interpolation point coordinate Pi can be easily calculated by creating a move history file each time the end point coordinate is continuously moved, calculating stroke length Ls from the created move history files, and equally distributing the files according to the number of pages.

In FIG. 11 (b), the layouts of pages 104-1 and 104-3 (two pages) are displayed in the start and end points, respectively. The layout of page 104-2 is displayed in interpolation coordinate Pi. If the number of pages increases, the stroke between the start and end points is finely distributed according to the number of pages. During execution of this operation, curve 104-4 including start point Ps, interpolation point Pi, and end point Pe is compositely displayed to match each page, enabling the user to instinctly understand the entire page layout condition.

FIG. 12 shows how the scattered pages are collected. FIG. 12 (a) shows that the left hand is fixed with the pages scattered (FIG. 11 (b)) and the right hand is moved in the direction opposite to the scattering direction. FIG. 12 (b) shows the status in which the right hand was moved by half in the direction opposite to the scattering direction. In this way, scattered pages can be collected by moving them in the direction opposite to the scattering direction, starting from end point coordinate Pe.

FIG. 13 is the explanatory drawing for judging whether page separation or collection is performed according to the specification of end point coordinate Pe. When the distance between the group of the stored move history file coordinates and the specified end point coordinate Pe' (distance with the coordinate nearest to Pe' in the move history file coordinate group) is greater than the specified threshold value r (range of radius r), it is judged that page separation is performed. Conversely, when F, the distance is less than the specified threshold value r, it is judged that page collection is performed. A move history file coordinate is stored each time end point coordinate Pe is continuously moved. For page collection, since the right hand is moved in the direction opposite to the moved coordinate direction, it is important to compensate the move history file coordinate as the current end point coordinate.

Page replacement is realized by temporarily taking out the page to be replaced in the page opening status, performing opening to the page into which the page is to be inserted, and inserting the page. Page replacement can also be realized by performing page separation and inter-page parallel shifting one-handed.

As explained above, the method for object handling by the hand gesture operation is almost the same as the actual desk handling method. The operation efficiency of the man-machine interface is improved by a large margin because this operation is an extremely instinctive operation.

(5) Pen Input And Editing Operation

Figure 14B:
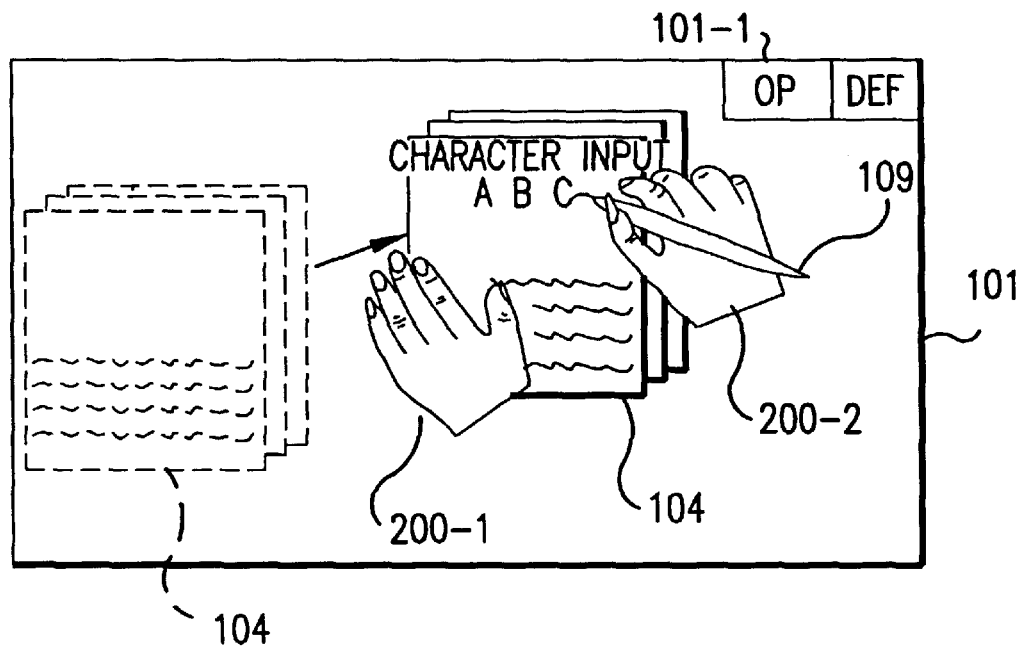
FIGS. 14a and 14b schematically depict character/figure input and editing processing in accordance with preferred embodiments of the present invention.
Figure 14C:
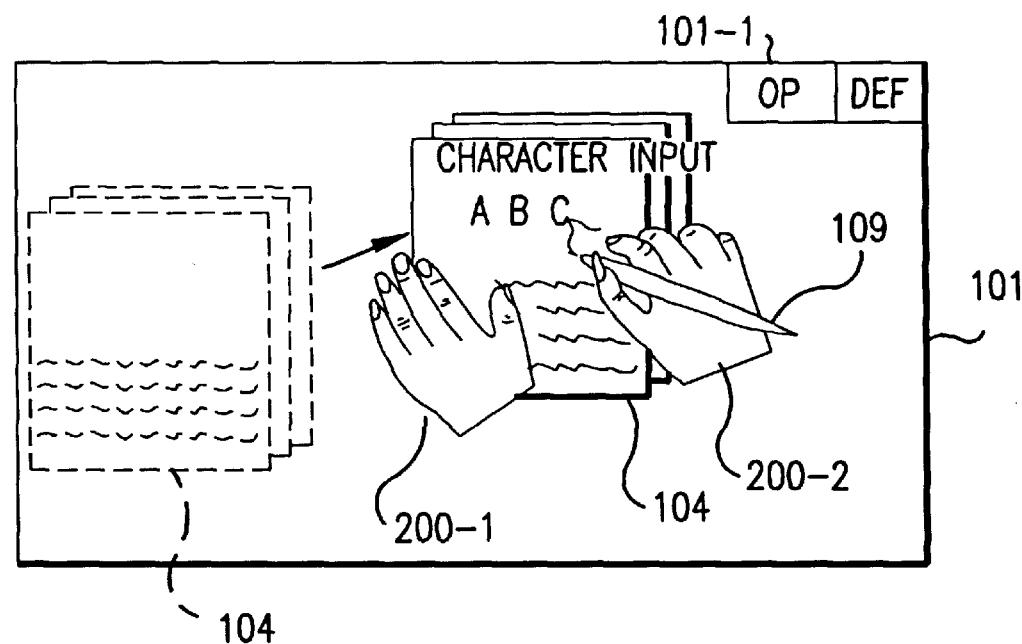

Next, in addition to the instinct object operation, input of characters or figures from a display object (109 in FIG. 2) using the stylus pen and editing of the input characters or figures are explained in conjunction with FIG. 14.

FIG. 14 (a) shows that stylus pen 109 was used to input characters from the moved image object 104 (104' 104), is already recognized and displayed in a fair copy. For the image object, only its holograph appears during coordinate input. When character allocation (frame allocation and time-out allocation, etc.) terminates, recognition is started and the character corresponding to the code is displayed.

Next, to edit the characters and figures that are already input, switch stylus pen 109 from the input mode to the editing mode (Example of switching methods: Switching using a menu, switching according to the object to be edited and stroke length information, and switching using a pen switch). As shown in FIG. 14 (b), input the x pen gesture from the object to be edited (that is, "character input"). This pen gesture is recognized and character string "character input" is immediately erased. This method is the same as the method for calibration in a red pen on a sheet of paper. It is effective in improving the operation efficiency of the man-machine interface by a large margin.

In the preceding explanation, the mode is switched to the page handling mode when the object to be displayed is being held by both hands. When a pen is held, however, the function that inhibits switching to the page handling mode but permits switching to the document/editing processing mode is necessary. This function, however, can be easily realized by monitoring the hand movement in the monitoring camera and detecting pen holding. In addition, operation is the same not only in character input and editing but also in figure input and editing.

Next, the above-mentioned processing procedures related to the execution example of this invention are explained according to FIGS. 15 to 24. In particular, the characteristic part function (blocks 500 to 800 of FIG. 1) processing procedures are explained.

Image Fetch Processing

Figure 15:
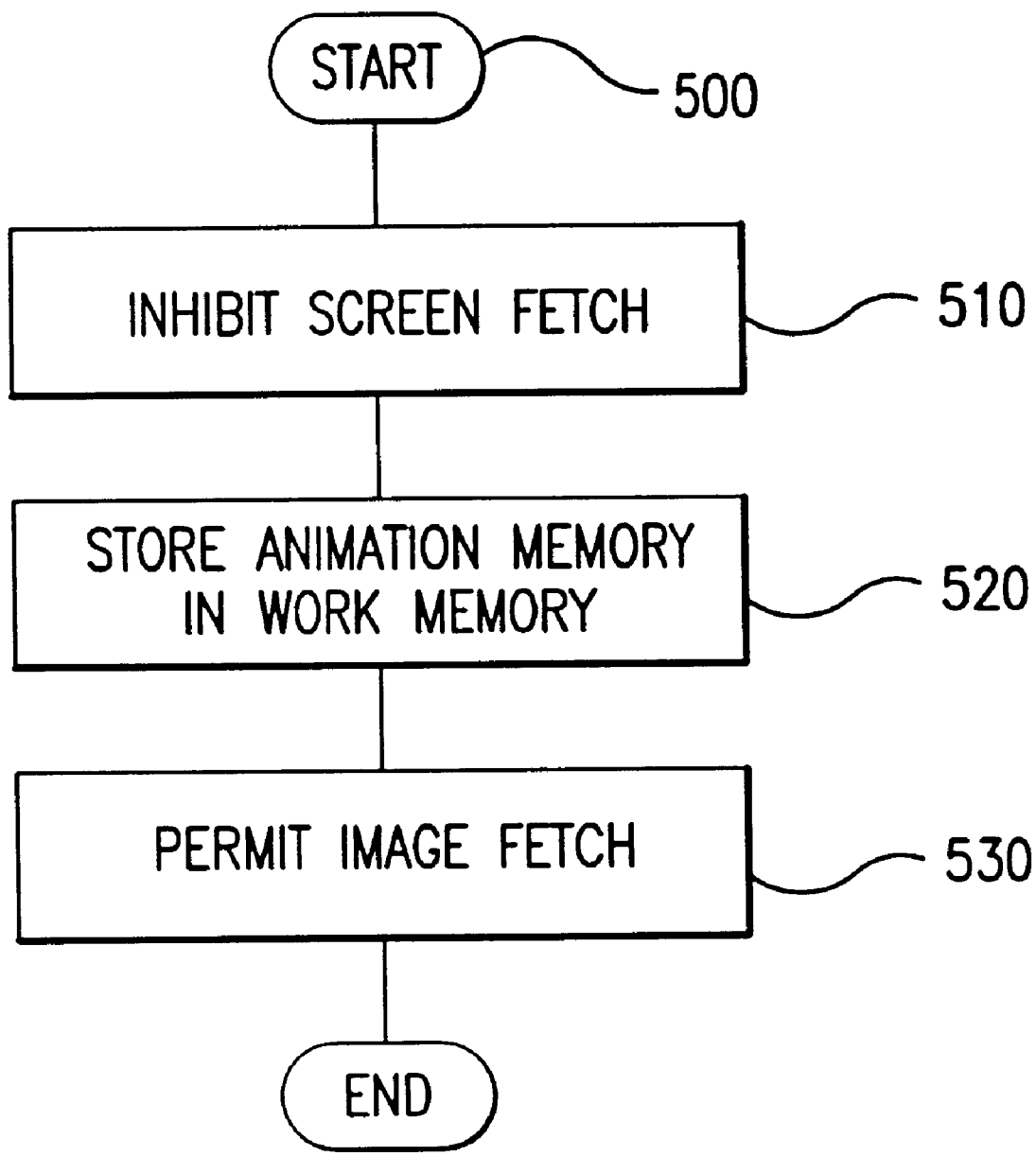
FIG. 15 is a flowchart indicating the image fetch processing procedure according to a preferred embodiment of the present invention.

FIG. 15 is the flowchart indicating the image fetch processing procedure (block 500 of FIG. 1). Image input I/F 106 in the hardware block diagram of FIG. 2 is equipped with animation memory (not illustrated in the figure) that fetches images from the overhead camera realtime. For this reason, to process images, the contents in this animation memory must be temporarily fetched into memory 402 in the processor. This processing is shown in FIG. 15. Image fetch inhibition is specified in Step 510 so that the contents of animation memory are not rewritten when an image is being fetched (Step 520). After image fetch has terminated, image fetch permission is specified in Step 530.

Definition Of Actual Object Interface Part Attributes

Figure 16:
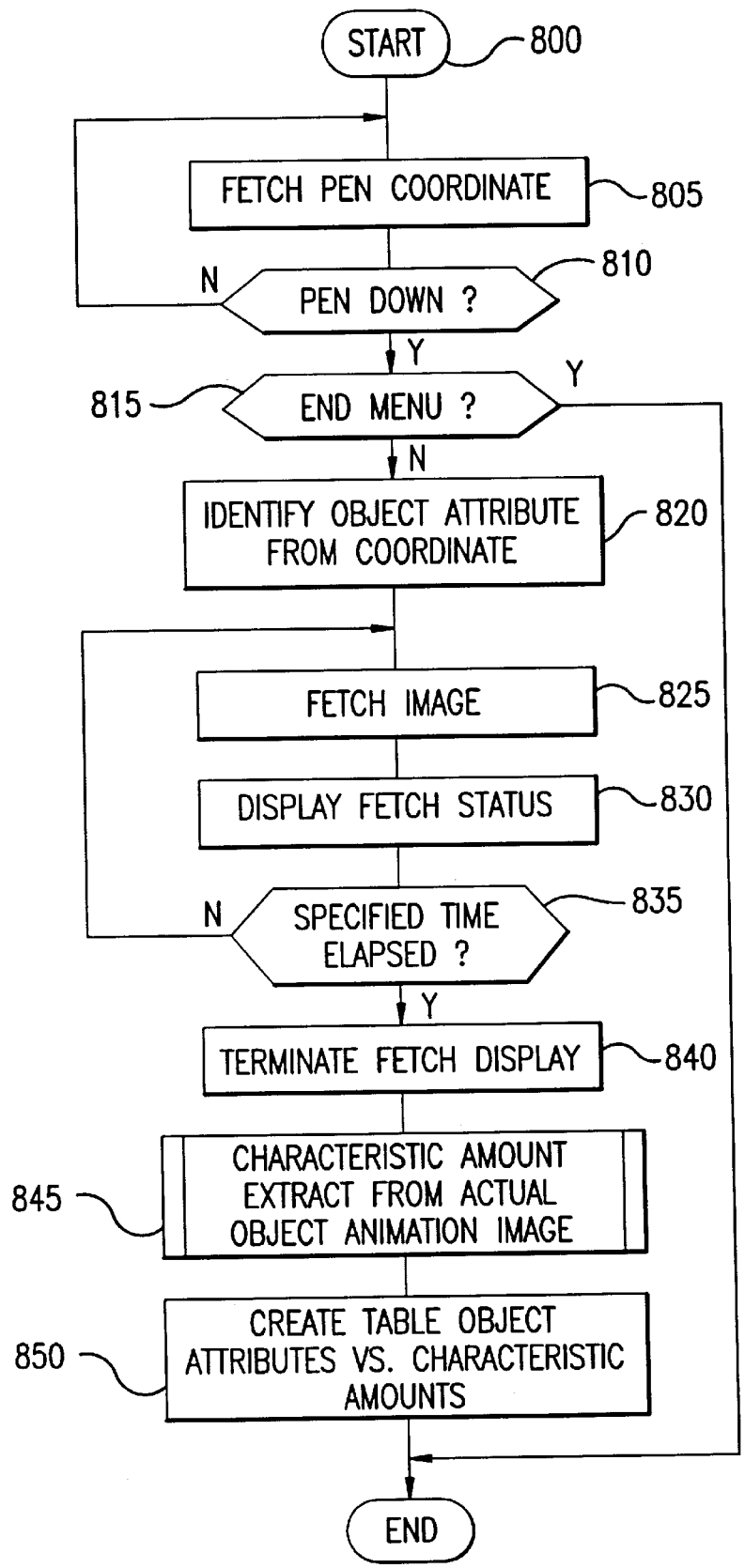
FIG. 16 is a flowchart indicating the actual object attribute definition processing procedure according to a preferred embodiment of the present invention.

Definition of actual object interface part attributes (block 800 of FIG. 1) based on the attribute definition screen shown in FIG. 3 (a) is explained according to FIG. 16. Operation/definition mode 101 is supposed to be already in the definition mode. First, since attribute definition menu sheet 1012 is displayed, pen coordinate fetch (Step 805 to Step 810) is continued till the pen down signal is issued. The pen down signal is detected by the SW signal of stylus pen 109.

Next, when the coordinate at pen down time is end menu 101-6 (Step 815), this processing terminates. When the coordinate at pen down time is not end menu 101-6, the interface part attributes are identified from the pen coordinate (Step 820). Then, as shown n 101-4 and 101-5 of FIG. 3 (a), the fetch area and guidance are displayed (Step 830) and at the same time image fetch is started (Step 825). Image fetch is performed for the specified time (Step 835). The time at which image fetch terminates can be displayed in characters or icon for the operator to help deepen his understanding. The illustration of the flow is omitted.)

When the specified time has elapsed, the fetch end display (Step 840) (that is, end guidance and fetch area) is erased and the characteristic amount is extracted from the fetched interface part image (Step 845). This characteristic amount extraction is explained in FIG. 21. When characteristic amount extraction terminates, the table indicating the correspondence between object attributes and characteristic amounts is created (Step 850). This table consists of part names, operation functions, an a part characteristic amounts (area, ambient length, center of gravity, size, and complexity, etc. This object attribute definition needs to be executed only once in advance.

Hand Operation Understanding

Figure 17:
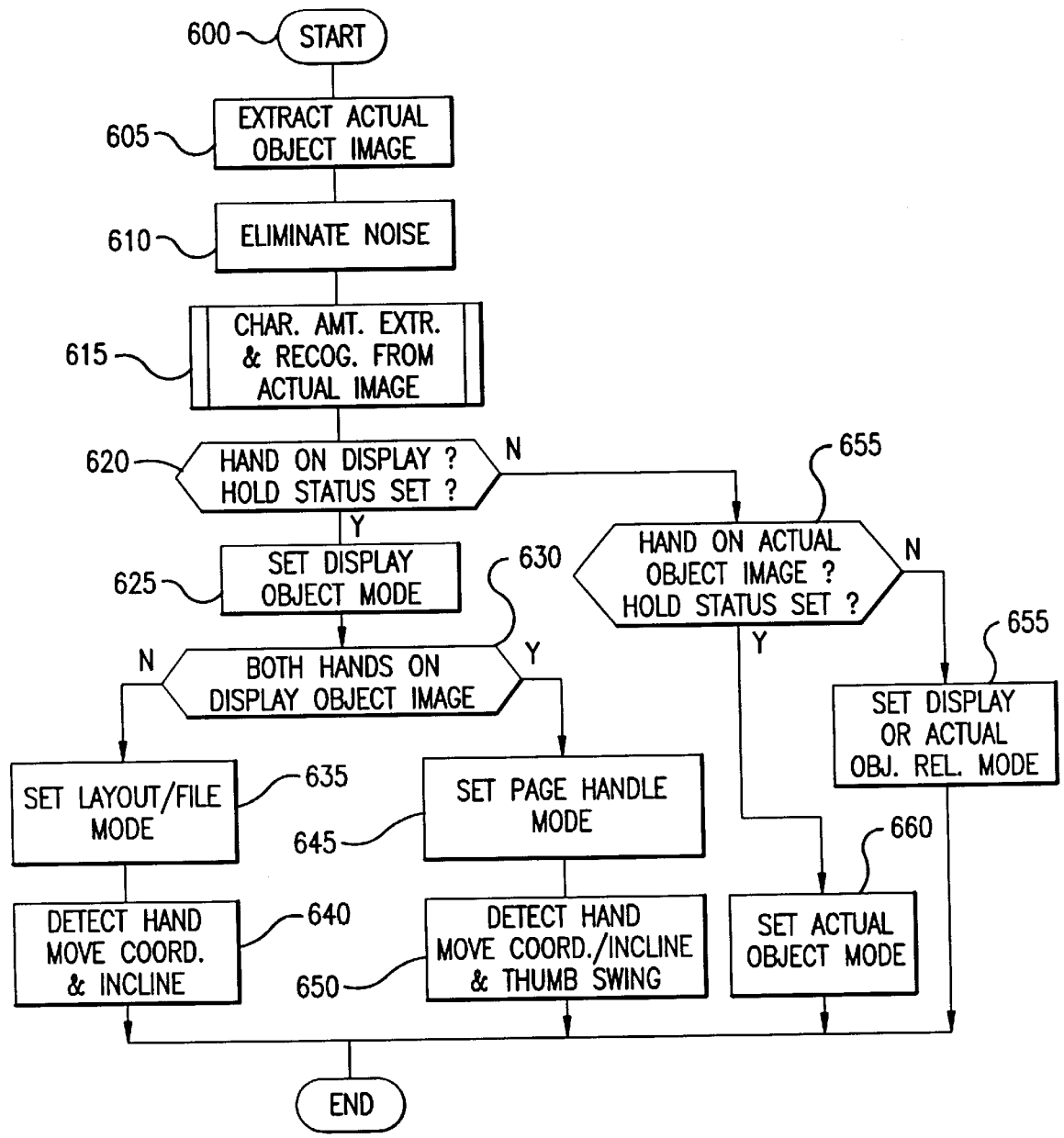
FIG. 17 is a flowchart indicating the hand movement understanding processing procedure according to a preferred embodiment of the present invention.

Next, hand operation understanding processing of block 600 in FIG. 1 is explained according to FIG. 17. In this processing, an actual object and the hand gesture are recognized and operator commands and their parameters are calculated. First, to extract only actual images, the difference between the image object (display object) and the image fetched in image fetch processing is extracted (Step 605).

Next, noise is removed from the differential image in Step 605 by filtering (Step 610). The well-known space filter integration operator is used for filtering. After only the actual image has been extracted, the characteristic amount of this image is extracted and the part is recognized (Step 615: Details are given in FIG. 22.)

Next, whether the hand location for plane display 101 is on the display object to be operated is judged. More specifically, whether the distance between the hand characteristic point coordinate and the characteristic point coordinate of the object to be displayed is within the specified value is judged. Whether the hand is the hold gesture is also judged (Step 620). When the hand location for plane display 101 is on the display object to be operated and the hand is the hold gesture, the display object hold mode is set (Step 625). Then, whether both hands are on the image of the display object to be operated and they are the hold gesture is judged (Step 630). When only one hand is the hold gesture, the layout/file mode is set (Step 635). When both hands are the hold gesture, the page handling mode is set (Step 645).

When the mode is judged as the layout/file mode, various parameters for the hand holding the display object are operated (Step 640). The post-movement coordinate and wrist inclination are calculated as parameters. As explained in FIG. 9, the wrist inclination can be obtained by referencing middle finger direction D.

When the mode is judged as the page handling mode, various parameters for both hands holding the display object are operated (Step 650). In addition to the above-mentioned single hand parameters, the thumb swing status is also detected. The thumb swing status can be easily judged according to the difference between the detected tip coordinate position of the thumb and the previous coordinate position.

When the hand is not a display object, Step 620 jumps to Step 655. When one hand is on the image of an actual object (concretely, when the distance between the hand characteristic point coordinate and the characteristic point coordinate of the actual object is within the specified value) and the hand is the hold gesture, the actual object hold mode is set (Step 660). When the hand is not the hold gesture in Step 655, the release mode is set on the assumption that both the display object and actual object are already released (Step 665).

Object Handling

Figure 18:
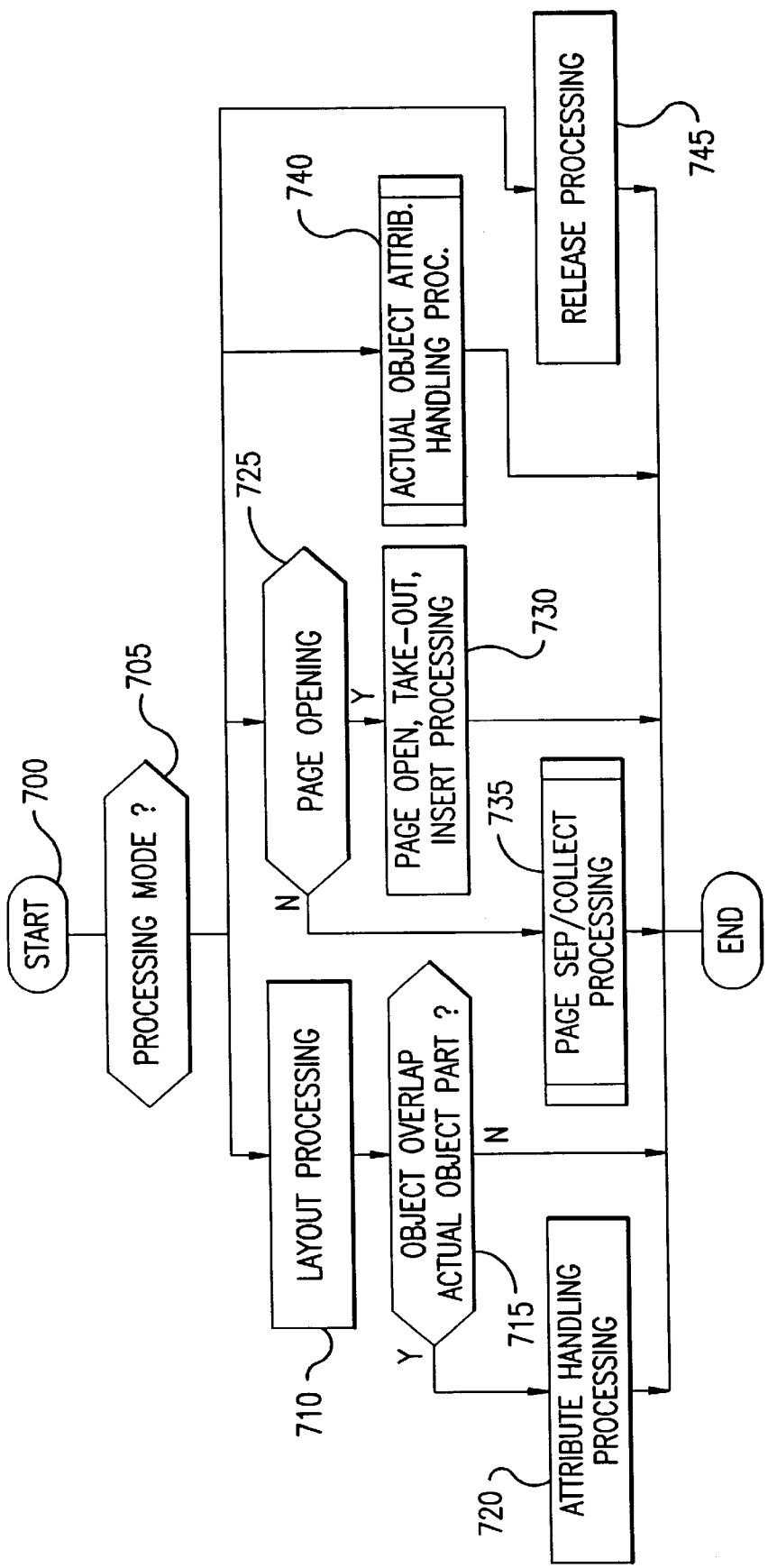
FIG. 18 is a flowchart indicating the object handling processing procedure according to a preferred embodiment of the present invention.

Next, after mode judgment and parameter operation, this data is used to perform handling processing (block 700 of FIG. 1) for the display object. FIG. 18 shows this processing procedure. First, whether the processing mode is the layout/file, page handling, actual object hold, or release mode is judged (Step 705).

When the processing mode is the layout/file mode, layout processing is performed first (Step 710). When the characteristic point coordinate of the display object overlaps (approaches) the characteristic point coordinate position of the actual part, the attribute processing corresponding to the actual object is performed (Steps 715 and 720). For a file part, for example, the display object is stored in the file device.

In layout processing (Step 710), the movement or rotation of the hold display object is displayed according to the move destination coordinate of the hand center-of-gravity position and wrist inclination data. For rotation display, the entire contents of characters and figures, etc., are rotated and displayed as if sheet of paper were inclined. The inclination of a display object can be easily displayed by using the postscript language, which is recently used by printers. When a display object is moved and rotated in layout processing, a pseudo friction sound occurs between the desk and a sheet of paper producing realism.

When the processing mode is the page handling mode (Step 705), whether page opening is necessary is judged (Step 725). Whether page opening is in progress is judged according to whether thumb swing is specified. When page opening is judged to be necessary, page opening/takeout/insertion processing is performed (Step 730). When page opening is judged to be unnecessary, page separation/collection processing is performed (Step 735). This processing is detailed in FIG. 19. As shown in FIGS. 12 and 13, in page separation/collection processing, whether page separation or page collection is performed is judged according to the relationship between the move coordinate of one hand and the fixed coordinate of another. For page opening, as in layout processing, a pseudo opening sound (ruffle) is generated. When the processing mode is the actual object hold mode (step 705), actual object attribute correspondence processing is performed (Step 740). This processing is detailed in FIG. 24.

Last, when the processing mode is the release mode (Step 705), release processing is performed (Step 745). Release processing means to release a hand from a display object or actual object. Releasing one hand during page handling and performing pen input by this hand are an example of layout processing. Even if the hand is on a display object during pen input, it is not judged that the object is being held.

Figure 19:
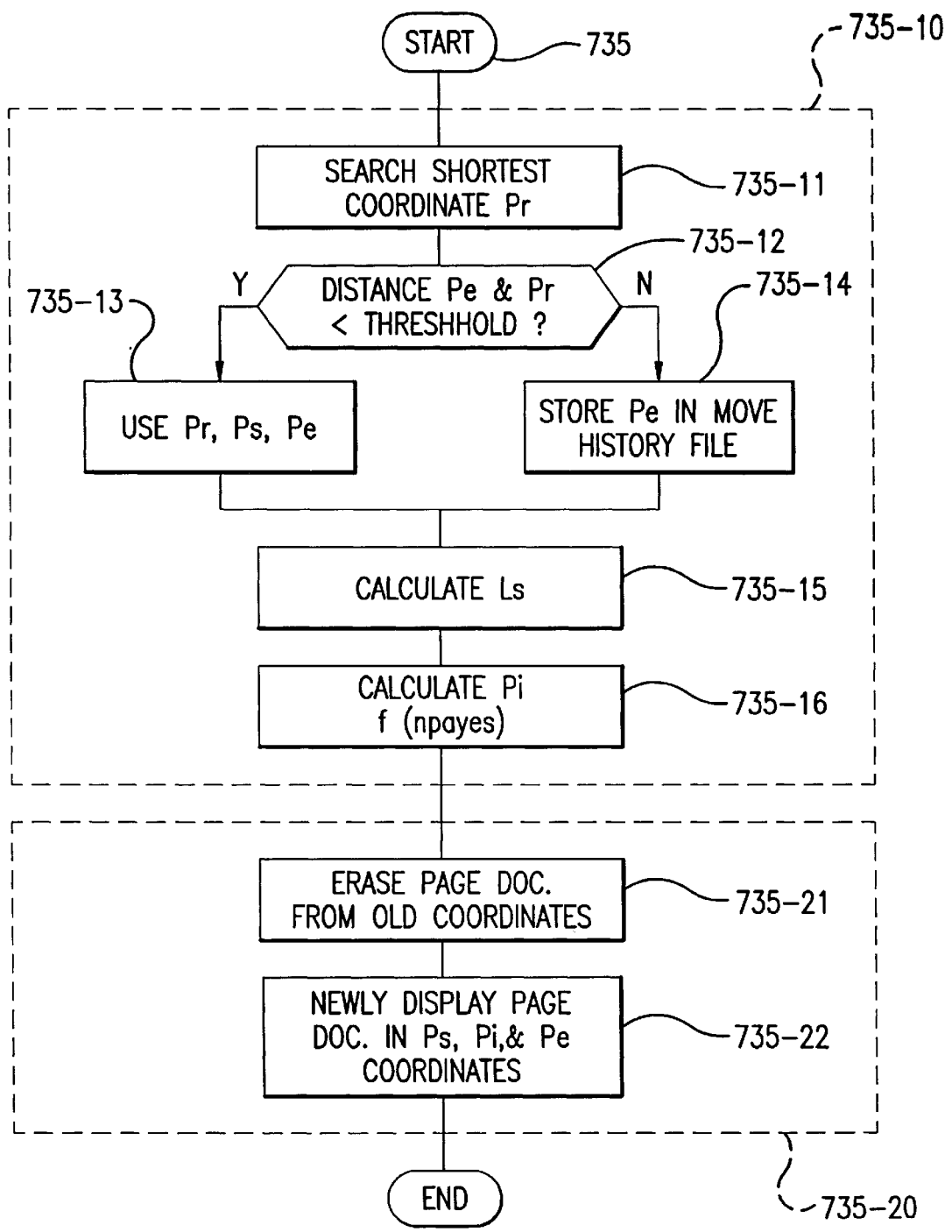
FIG. 19 is a flowchart indicating the page separation/collection processing procedure according to a preferred embodiment of the present invention.

FIG. 19 is the detailed flowchart for page separation/collection processing (Step 735 in FIG. 18). Page separation/collection processing is broadly classified into page placement coordinate calculation processing 735-10 and layout processing 735-20. Page placement coordinate calculation processing 735-10 calculates the coordinates for placing each document page from the coordinate between the start and end points. Page layout processing 735-20 displays each document page on the coordinates calculated by page placement coordinate calculation processing.

Page placement coordinate calculation processing can be realized by Steps 735-11 to 735-16. That is, of the end point coordinate Pe currently being fetched and the coordinates of the fetched move history file, shortest coordinate Pr is searched (Step 735-11). As explained in FIGS. 11 and 12, start point coordinate Ps and end point coordinate Pe are the points obtained by relatively shifting from the characteristic point coordinates of both hands (for example, P1 to P4 in FIG. 9) to the central point coordinate of each page. Next, whether the distance between the fetched end point coordinate Pe and shortest coordinate Pr is less than the threshold value is checked (Step 735-12). When the distance is less than the threshold value, page collection processing is determined to be performed and the point of shortest coordinate Pr is used as end point coordinate Pe (reverse operation of page separation) (Step 735-13). When the distance is not less than the threshold value, page separation processing is determined to be continued and the currently fetched end point coordinate Pe is stored in the move history file (Step 735-14). As a result of the above processing, one start point coordinate (fixed coordinate) and two or more end point coordinates (past moved move coordinates) are created.

Next, stroke length LS between the start and end points is calculated from data in this move history file (Step 735-15). In the illustrated example, interpolation point coordinate Pi to be equally distributed according to the number of pages n is calculated for this stroke length LS (Step 735-16). The number of interpolation point coordinates Pi is obtained by subtracting 2 from n because start and end points are excluded. When interpolation point coordinate Pi is calculated, the degree of dislocation may be gradually increased as logarithmic distribution, not equal distribution. In either case, interpolation point coordinate Pi can be easily calculated from stroke length Ls, distribution count, and data in the move history file. When equal distribution is applied, for example, the coordinates in the move history file are sequentially added to the start point coordinate (method, etc.: Deviation Dx+Dy). When the sum exceeds the equally-divided length, the coordinate is used as the interpolation point. By repeating this operation, interpolation point coordinate Pi can be calculated.

When page placement coordinate calculation processing 735-10 terminates, next layout display processing 735-20 is performed. First, each page document displayed in the old coordinate positions is temporarily erased to display each page in new coordinate positions (Step 735-21). Then, each page document is displayed in the new coordinate positions (Step 735-22).

Figure 20:
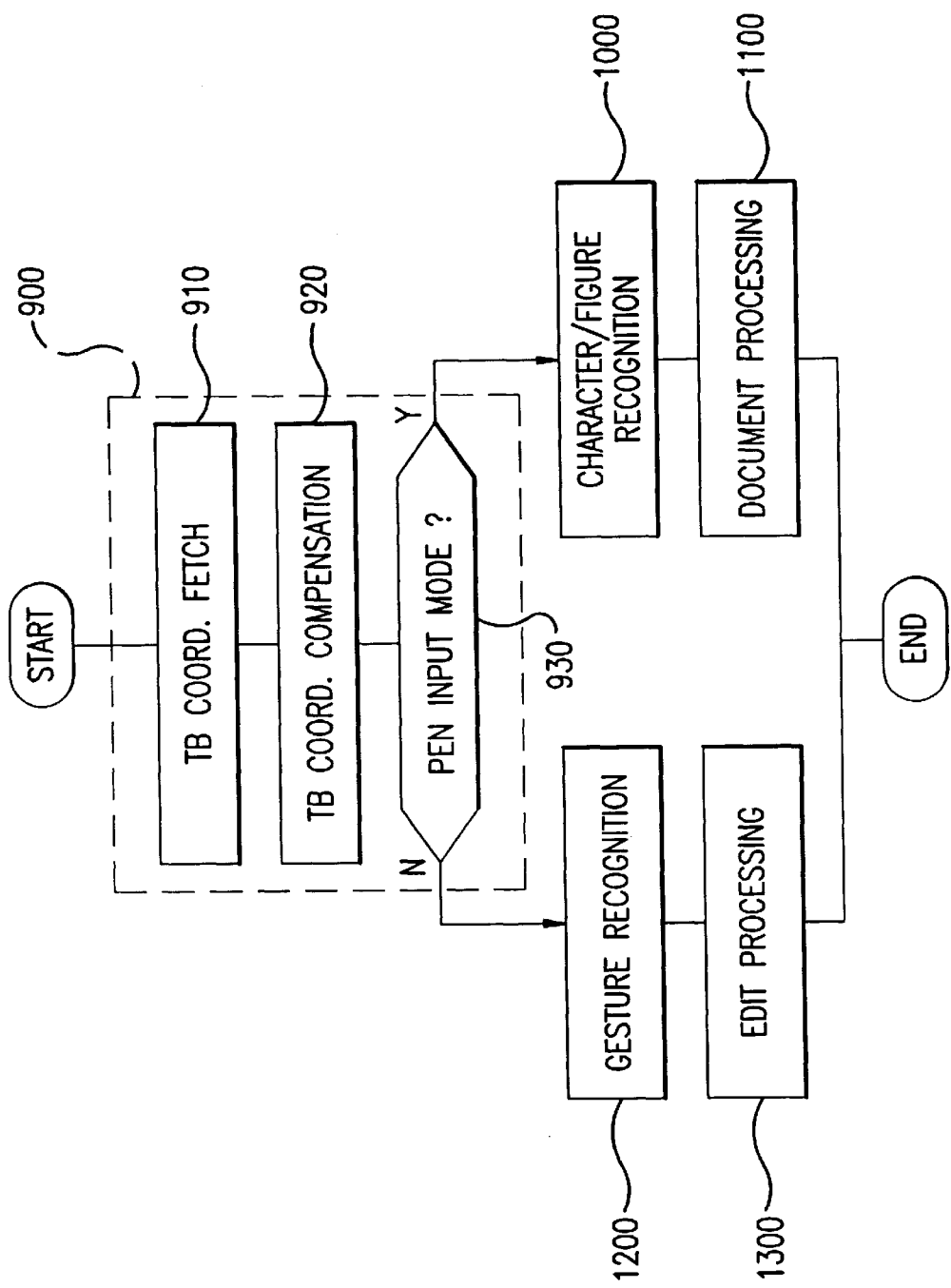
FIG. 20 is a flowchart indicating the character/figure input and editing processing procedure according to a preferred embodiment of the present invention.

FIG. 20 is the flowchart indicating the procedures for display object pen input and editing. The block numbers in FIG. 20 correspond to those in FIG. 1. Coordinate fetch block 900 is detailed in blocks 910 to 930. That is, the TB coordinate is fetched (block 910), then converted to the coordinate space of the object to be displayed by compensating according to layout information (move destination and rotation). This enables the linkage between the TB coordinate space and the object to be displayed.

Next, whether the processing mode is the pen input mode or pen editing mode is judged (block 930). When the stroke length is greater than the specified value and the object to be edited exists under the stroke, the processing mode is assumed to be the pen editing mode. Otherwise, the processing mode is assumed to be the pen input mode. For the pen input mode, characters and figures are recognized (block 1000). The recognition result is reflected on document processing (block 1100) and a document is generated. For the pen editing mode, the input stroke is recognized as the editing gesture (block 1200) and editing processing is executed (block 1300). The recognized editing gesture becomes the editing command. The concrete explanation of blocks 1000 to 1300 is omitted because it can be realized in the conventional method.

Figure 21:
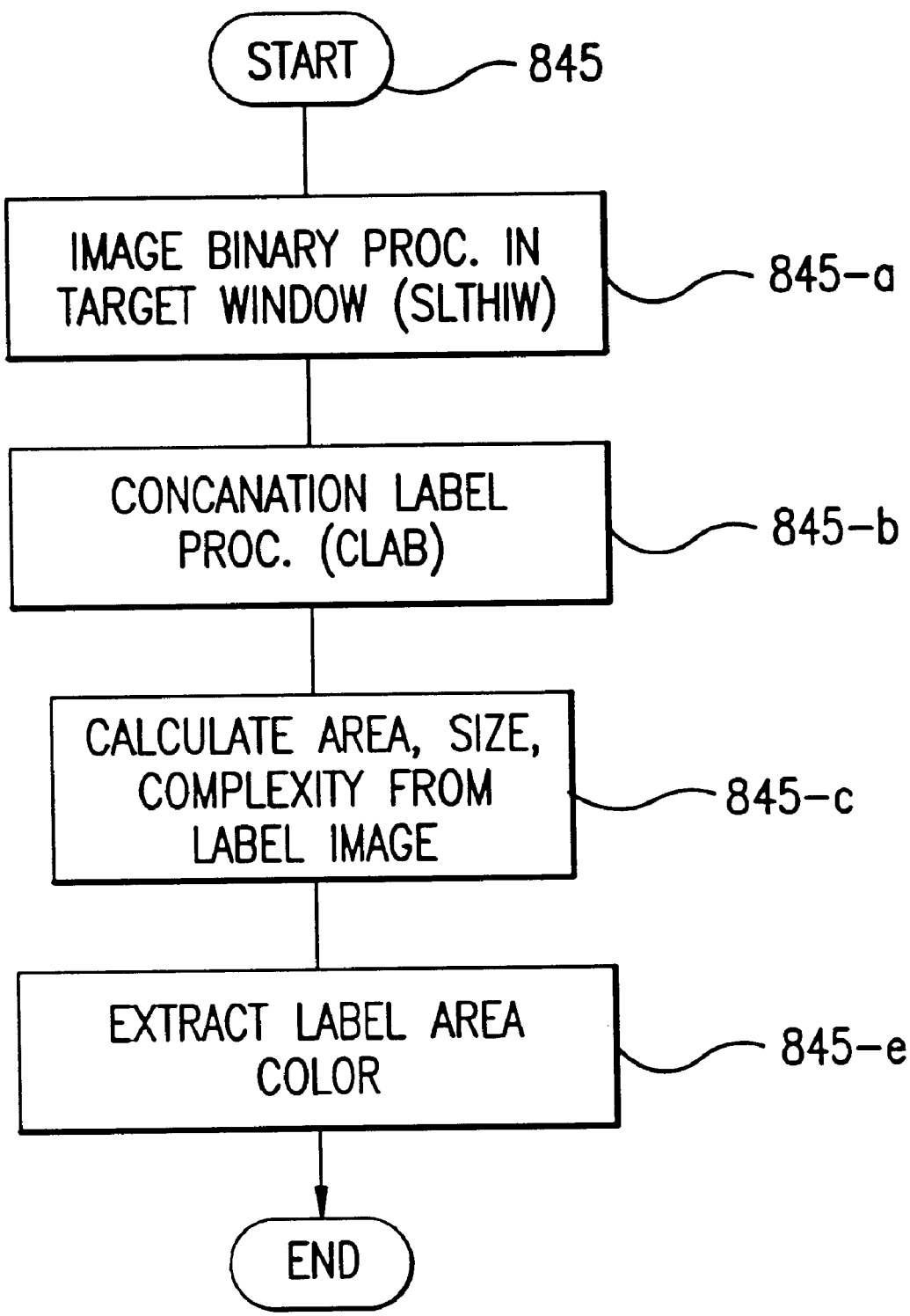
FIG. 21 is a flowchart indicating the actual object characteristic amount extraction procedure according to a preferred embodiment of the present invention.

FIG. 21 is the flowchart indicating the detailed procedures for extracting characteristic amounts (Step 845 of attribute definition processing in FIG. 16). First, image binary processing (SLTHlW) is performed in the window into which images are fetched (Step 845-*a*), then binary image concatenation element labeling processing is performed (Step 845-*b*). This labeling is applied to all the areas. Next, geometrical characteristic amounts are calculated from this label image (Step 845-*c*). The geometrical characteristic amounts to be calculated include (1) area (AREA), center of gravity (CGRV), ambient length (PRMT), (2) size, and (3) complexity. In addition, color information is extracted for each label area (Step 815-*e*). As explained above, a table is created from the characteristic amount data collected for each actual object in advance. This table is used for recognition. In this execution example, recognition using characteristic amount data is premised. Despite this, it is needless to say that fuzzy and neuro techniques can be used for recognition.

Figure 22:
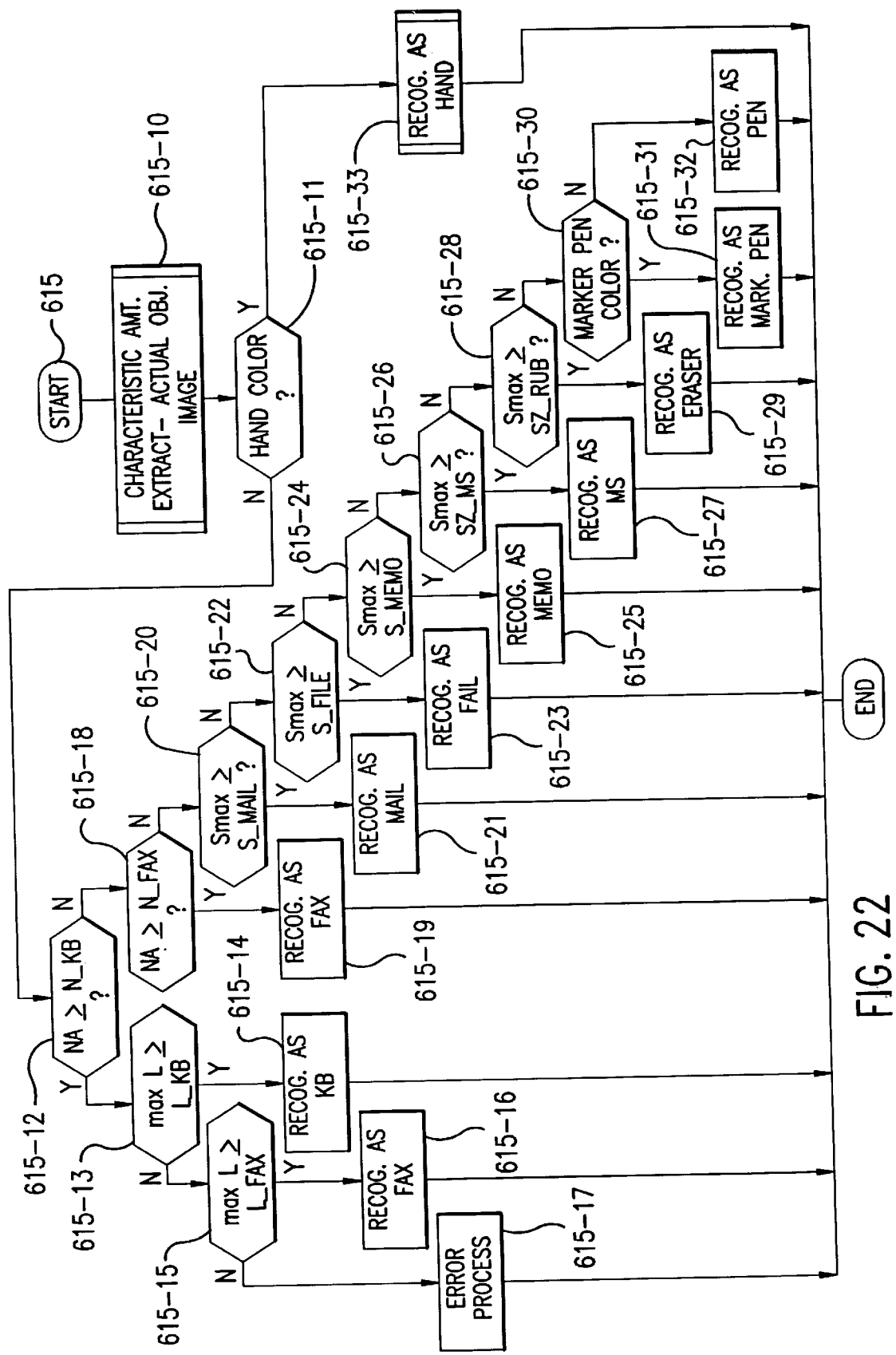
FIG. 22 is a flowchart indicating the actual object characteristic amount extraction/recognition procedure according to a preferred embodiment of the present invention.

FIG. 22 is the flowchart indicating the detailed procedures for extracting and recognizing the actual object characteristic amount (Step 615 of FIG. 17). First, the actual object characteristic amount is extracted in Step 615-10. This concrete processing is the same as Step 845 in FIG. 21. The basic concept of recognition processing is explained below. In consideration of the objects to be recognized in FIG. 3, (1) recognition is classified into two types: hand recognition from hand color information and actual object recognition. (2) For objects other than hands, the number of areas, area, and ambient length are combined for recognition. If judgment cannot be made from these characteristic amounts, size information and color information are used for judgment. Hand recognition is performed according to complexity and area characteristic amount data. This recognition is detailed in FIG. 23.

First, recognition processing is detailed according to Step 615-11 to Step 615-33 in FIG. 22. In Step 615-11, whether color information is hand color is judged. When color information is hand color, hand recognition is performed in Step 615-33. When color information is not hand color, actual objects other than hands are recognized. The number of areas is compared with threshold value N KB and the ambient length is compared with threshold values L__KB and L FAX to recognize KB and FAX (Step 615-12 to 615-16). If neither KB nor FAX is recognized, relevant processing (display, etc.) is performed because an error is assumed to have occurred (Step 615-17). When the number of areas is less than the specified value in Step 615-12, it is compared with another threshold value N__FAX and further compared with the threshold value (S MAIL, S FILE, S__MEMO) of the part having the maximum area in each area (Step 615-18 to Step 615-25). If recognition is still unsuccessful, size information is compared with threshold values SZ__MS and SZ__RUB and color information is further judged for recognition (Step 615-26 to Step 615-32). As explained above, the tree structure of this recognition must be modified anytime, depending on each actual object. The neuro or fuzzy technique eliminates the need to use this tree structure of recognition because characteristic amount extraction and recognition are performed simultaneously.

Figure 23:
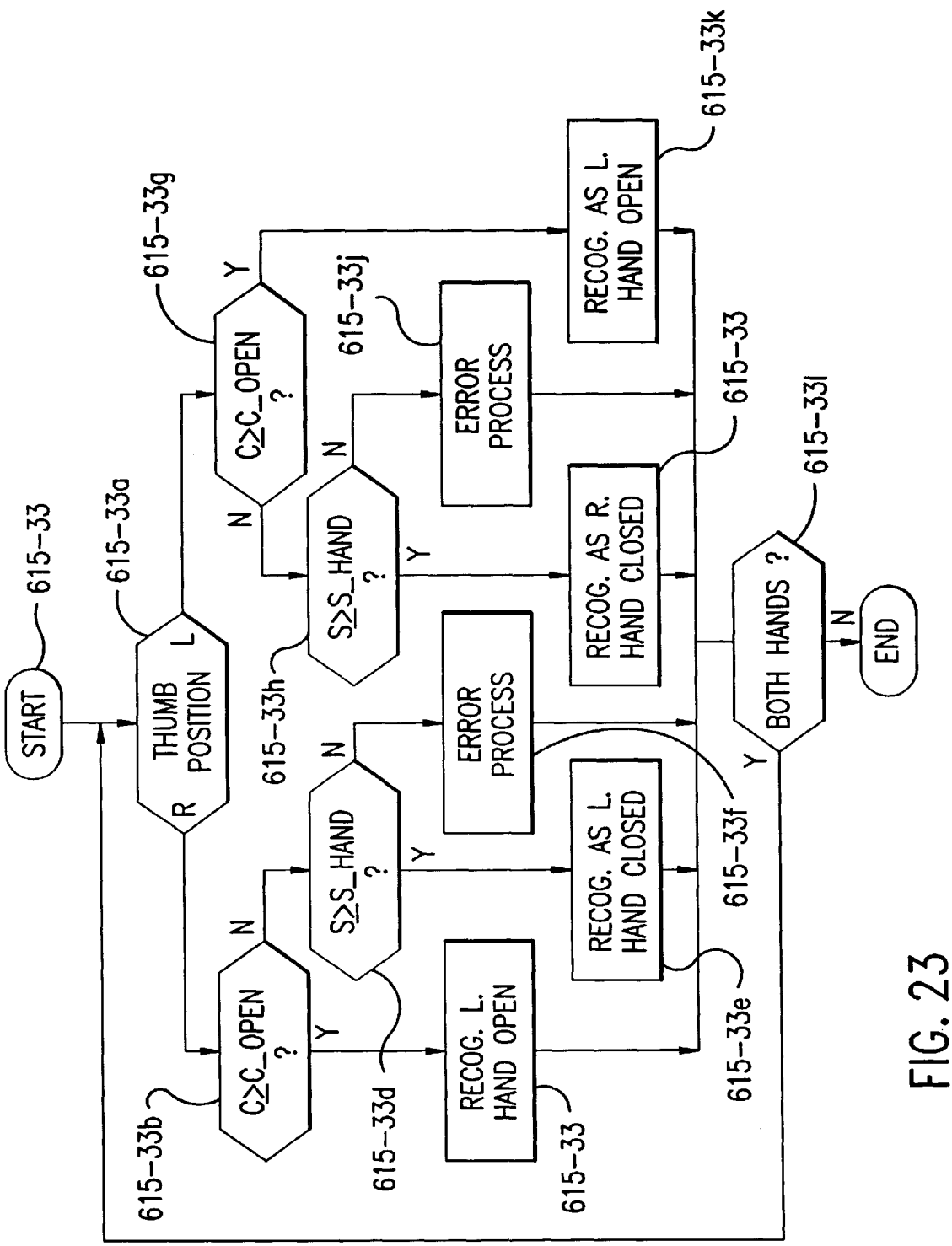
FIG. 23 is a flowchart indicating the hand recognition processing procedure according to a preferred embodiment of the present invention.

FIG. 23 is the flowchart indicating the concrete hand recognition procedures. In this processing, whether the hand gesture is the hold or release gesture is judged and the status of both hands is judged. First, the left or right hand is judged according to the hand center-of-gravity position and the thumb position (Step 615-33a) When the detected hand is the left hand, the program jumps to Step 615-33b because the thumb position is right to the center of gravity. When the hand complexity is greater than threshold value C OPEN, the left hand is judged to be opened (Steps 615-33b and 615-33c). When the complexity is less than threshold value C__OPEN in Step 615-33b and the area characteristic amount is greater than or equal to threshold value S HAND, the left hand is judged to be closed (Steps 615-33d and 615-33e). When the area characteristic amount is less than or equal to threshold value S HAND, error processing is performed (Step 615-33f) because an error is assumed to have occurred. When the detected hand is the right hand in Step 615-33a, judgment for the right hand is the same as for the left hand (Step 615-33g to Step 615-33k). Last, for both hands, their status is re-judged. Thumb swing judgment is performed in the closed-hand status in this case, and attention is paid only to the thumb (The illustration is omitted). This judgment is enabled by checking the tip coordinate history of the thumb and determining the direction in which the coordinate is moving.

Figure 24:
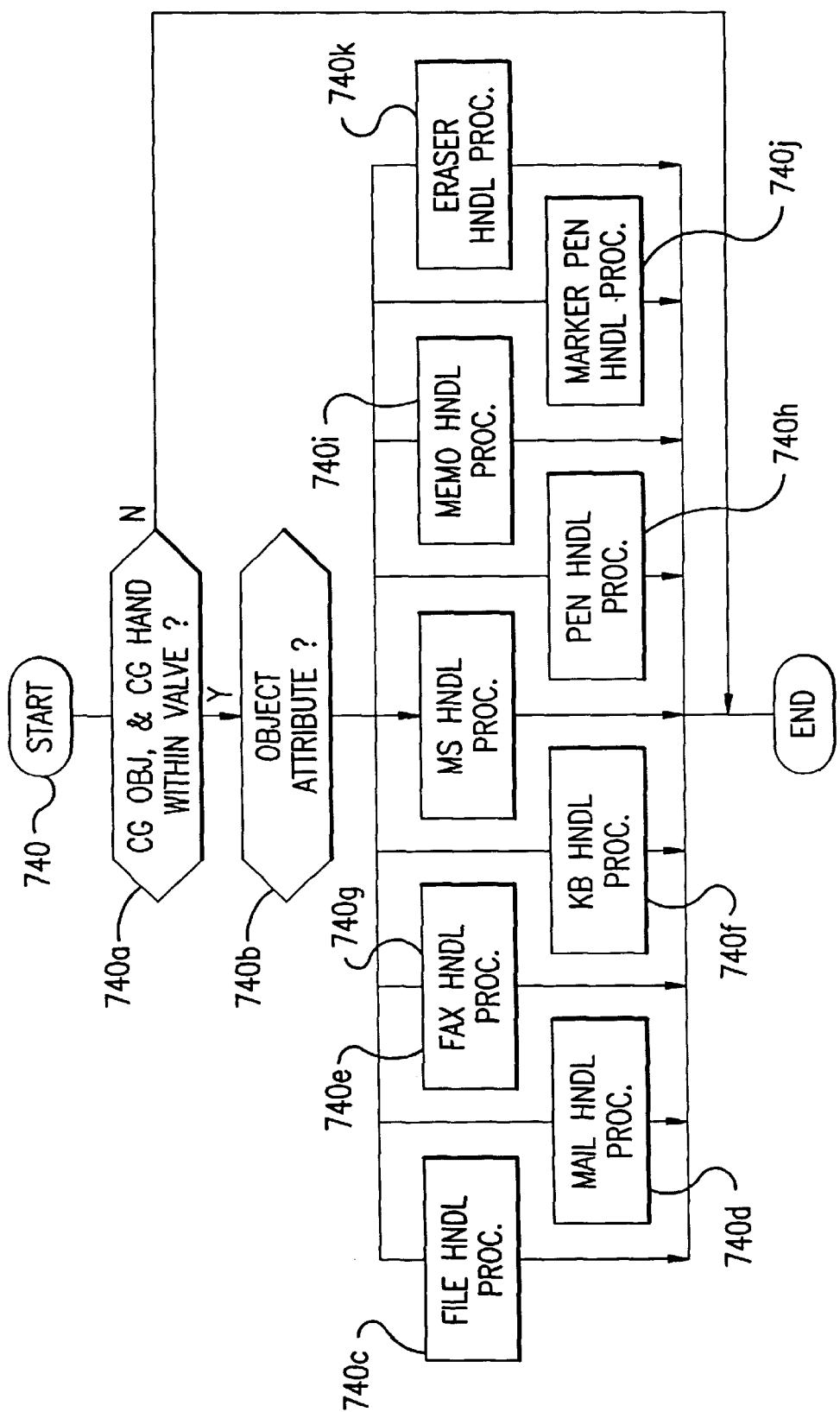
FIG. 24 is a flowchart indicating the actual object attribute handling processing procedure according to a preferred embodiment of the present invention.

FIG. 24 is the flowchart indicating the concrete procedures for actual object attribute handling processing (Step 740 in FIG. 18). In this processing, when a hand is placed on an actual object and the hold gesture is executed, what operation is to be performed is determined. In Step 740a, whether the center of gravity of the actual object and hand center-of-gravity coordinate are within the specified value is judged. When they are within the specified value, processing is performed according to the actual object attribute (Step 740b to Step 740k). This attribute is determined according to the items defined in attribute definition processing in FIG. 16.

According to the above described preferred embodiment of the invention, the following effects are achieved:

A first effect is that an instinctive operating environment can be established to improve the operation efficiency of the man-machine interface by a large margin because actual objects themselves can be used as man-machine interface parts. Actual objects can be used as man-machine interface parts because they are associated with the image objects (display objects) to be displayed on the display screen.

A second effect is that specification by menus and icons is unnecessary during operation and objects can be operated without any mode set because the hand gesture is recognized. The hand gesture can be operated more naturally because the opened hand is associated with the object release operation and the closed hand is associated with the object hold operation (same as the actual action format). In addition, the operation method can be easily learned because the handling contents are identified according to whether the hand gesture operation is the one-hand operation or both-hand operation (layout file, page handling). Furthermore, filing can be easily done simply by piling the object to be displayed on the corresponding file part. Likewise, page handling can also be easily performed by combining hand movement, hand rotation, and finger swing. In page separation/collection processing, in particular, the layout of laminated documents can be displayed and operated by moving one hand while holding a display object by both hands (sense like actual movement of sheets of paper). This improves the operation efficiency of the man-machine interface.

A third effect is that a pseudo sound can be generated during object handling because the pseudo effective sound generation method is provided (realism).

A fourth effect is that besides the horizontal plane display unit, abstract drawings such as an office layout drawing and a schematic drawing, schedule tables, and work reports, etc., can be displayed on the vertical-front display unit. This improves office application efficiency by a large margin. It is also natural that paper resources can be reduced because an electronic desk which uses no paper can be used.

A fifth effect is that since the pen input environment exists, characters, figures, and memos can be easily input as required. The pen gesture command can also be used to easily edit the input objects.

A sixth effect is that since both the plane and front display units use the rear projector which projects light from the rear of a screen, contrast is good. Also, even if an obstacle exists between the overhead camera and screen, the image of the object to be displayed is not influenced.

In the above-described embodiment of FIGS. 1–25, rear projection is used to display objects on the plane display unit which is a large screen. Front projection can also be used instead of rear projection. Front projection is performed from the overhead camera to the desk surface. However, peripheral illumination and an obstacle which exists in the middle of an optical path may cause image disorder. In addition, a CRT and a liquid display can be used instead of projectors. Currently, however, the CRT has a defect that if a transparent coordinate input unit is laminated, a parallax occurs because the CRT has a curved surface. To realize a big screen, the liquid display needs several panels because its size is about 17 inches. If several panels are used, however, an undisplayed area is generated. In other contemplated embodiments, the environment in which the objects to be displayed are directly handled by hand remains unchanged.

In the above-mentioned embodiment of FIGS. 1–25, the hand hold operation of a display object is detected as the closed hand and the hand release operation detected as the opened hand. Besides this method, the signals of a pressure sensor can be used to detect the hand hold and release operations. That is, placing a palm on a desk is detected by this pressure sensor. Whether a palm is on the object to be displayed is also detected by a monitoring camera. A pressure sensor which can simultaneously detect two or more locations should be used. The camera or optical sensor placed on the horizontal surface of the plane display unit can also be used to detect a palm. In this way, any methods for detecting touching a desk surface or raise can be used.

In the above-mentioned embodiment of FIGS. 1–25, hand operation is monitored by the overhead camera. Monitoring of hand operation could also be carried out by providing overhead illumination and placing a camera under the plane display unit (rear side). In this method, the shadow picture of a hand is input to monitor hand operation. This method has an advantage that the psychological pressure caused by monitoring by the overhead camera is eliminated.

Besides installing the plane display unit horizontally on a desk, the unit can be installed vertically like a blackboard. This method is especially effective for presentation.

FIGS. 26–37 illustrate an embodiment of the present invention which has a specially designed link storage unit for facilitating interactive interchanging of information between user manipulated physical objects and electronically stored information.

Figure 26:
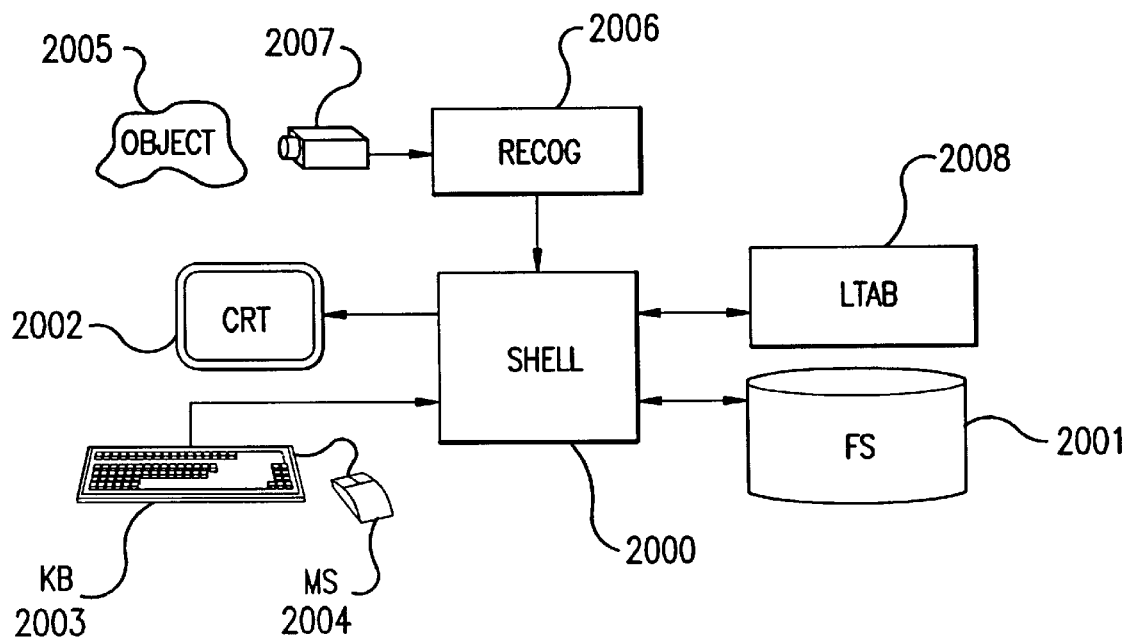
FIG. 26 is an overall block diagram of an information processing system constructed according to further embodiments of the present invention including a link storage unit for facilitating interactive interchange of information between operator handled physical objects and electronic information stored in the system.

In FIG. 26, the file operation unit 2000 (SHELL) provides a function by which a user operates electronic information stored in a file system 2001 (FS). Electronic information is stored in the file system 2001 in a tree structure and the file operation unit 2000 displays it on a display device 2002 (CRT) so that the user can operate it visually. For example, the document file is expressed by an icon having the external appearance of bundled papers and the directory is expressed by an icon having the external appearance of a folder. A program which is executed by the information processing unit is also stored in the file system 2001 as a file and displayed on the display device 2002 as an icon having the external appearance which expresses the function of the program.

The user operates an icon displayed on the display device 2002 using a keyboard 2003 (KB) or a mouse 2004 (MS) so as to add an operation to the contents of the file system 2001, open a necessary document, or start a program. For example, it is assumed that the user can open a document file by doubleclicking the icon indicating a document file by the mouse 2004. In this case, the program which prepares or edits the document is stored as an attribute thereof, so that the program for displaying or editing the document file is automatically started. The area for displaying an icon and the area for displaying a document file are displayed on the display device 2002 as a window respectively. The position and overlapping order of each displayed window are managed by the file operation unit 2000. The user can provide an instruction to the file operation unit 2000 so as to change the overlapping order of windows or close the windows.

The system in this embodiment can use an object so as to operate electronic information. Any object can be used so long as it can be discriminated by the object discrimination unit 2005. A camera 2007 provides a signal representative of the object to the object discrimination unit 2006. A link storage unit 2008 (LTAB) is operably connected with the file operation unit 2000, as described below.

Figure 27A:
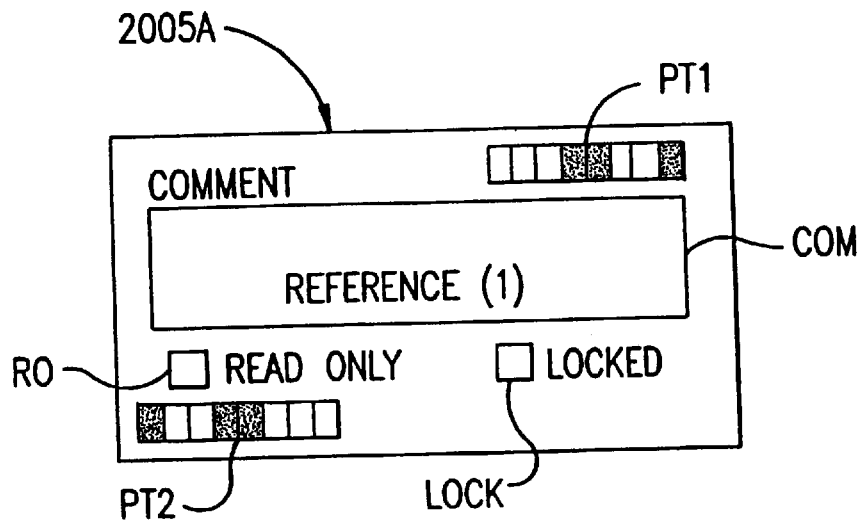
FIG. 27 is an illustration of an example of an object which is used in the information processing system of FIG. 26.
Figure 27B:
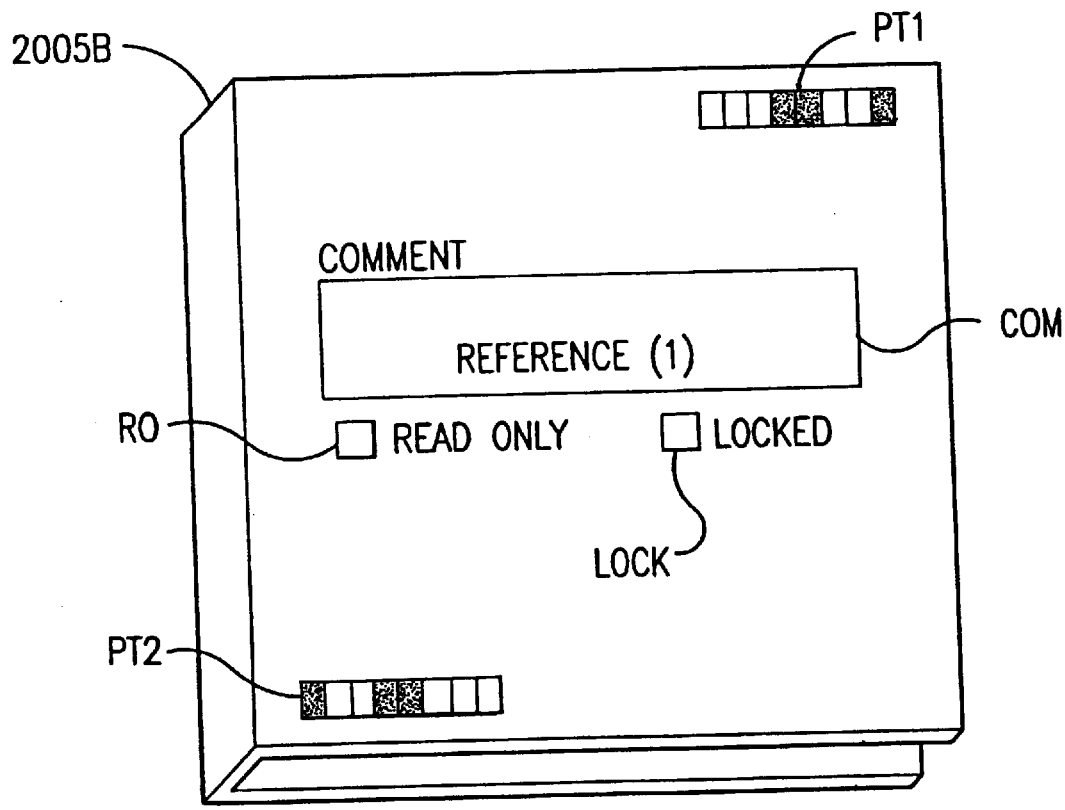

An object example to be used will be explained by referring to FIG. 27. FIG. 27(*a*) shows an example of a card-shaped article object 2005A to be used so as to correspond to a document file. The object discrimination unit 2006 reads the pattern PT1 on the upper right of the card and the pattern PT2 on the lower left of the card so as to specify an identification number of the card. There is a comment column COM in the neighborhood of the center of the card and the user can freely write comments on the card and the electronic information corresponding to the card. For example, the user can write the name of the card or the electronic file corresponding to the card and use it as a help when a specific card is to be searched for among bundled cards. There is a check column for operating the electronic information attribute corresponding to the card under the comment column COM. To make the electronic information corresponding to the card "read-only" the user may paint out the write inhibit box RO. To protect the electronic information corresponding to the card from erasing or the storage location from moving, the user may paint out the fixed box LOCK.

By indicating such a card to the system, the user can simply retrieve the electronic information corresponding to it, for example, a document file and can change the electronic information attribute via the operation for the card.

By adding the same information as that of the card to the paper folder object 2005B as shown in FIG. 27(*b*), it is possible to make the paper folder 2005B correspond to the electronic information. In this case, a use for storing an article (for example, proceedings of a conference) which is received via paper in the paper holder 2005B and for making electronic information (for example, a report written by the user) which is prepared by himself correspond to it can be considered. When there is such a correspondence, only by indicating the paper holder 2005B containing the proceedings of the conference, the report written by the user can be simply retrieved. As an object to be indicated to the system, an office supply such as a ruler may be used. For example, assuming that when a user indicates a ruler, the system is executing a construction program, indication of a ruler may be interpreted as a meaning of "selection of a linear drawing tool" of a construction or drafting program. In this case, when the dominant hand executes the position designation operation and the other hand executes selection of the tool by indication of the article, an efficient operation can be realized.

Figure 28:
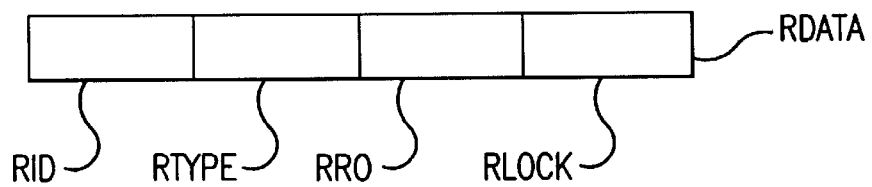
FIG. 28 is a drawing showing the data format of object discrimination information for the system of FIG. 26.

In this embodiment of FIG. 26, the object discrimination unit 2006 is installed so as to discriminate an object. The object discriminator 2006 discriminates the article which is indicated to the system by the user and inputs the information related to the identification number to the file operation unit 2000. The data format of object discrimination information RDATA which is an input to the file operation unit 2000 has four areas as shown in FIG. 28. The discriminated object identification number is stored in the object identification number area RID. The type of input is stored in the object input type area RTYPE. There are three input types such as IN, MOD, and OUT and they indicate that an object is indicated, and the status of the object is changed, and the indication of an object ends, respectively. The status of the object is whether the write inhibit box RO and the fixed box LOCK which are shown in FIG. 2 are painted out or not. The status of the write inhibit box RO of the discriminated object is stored in the object write inhibit status area RRO and the status of the fixed box LOCK of the discriminated object is stored in the object fixed status area LOC. Each box status is indicated by YES when it is painted out and by NO when it is not painted out.

In this embodiment of FIG. 26, a camera 2007 (CAM) is used so as to detect an object OBJ which is indicated by a user. The object discrimination unit 2006 processes an input image from the camera 2007 and discriminates an article which is indicated to the system by the user. In this case, the camera 2007 is used so as to discriminate an object. However, a scanner may be used in placed of the camera 2007 according to other contemplated embodiments. As still another contemplated method, a bar code is assigned to an object and the object may be discriminated by using a bar code reader. A device for generating a identification number using infrared light or minute radio waves may be attached to an object and a device for receiving the identification number may be installed in the object discrimination unit 2006 according to certain contemplated embodiments.

In the link storage unit 208 shown in FIG. 26, information which is necessary to make an object correspond to electronic information is stored. This information is added, changed or deleted by the file operation unit 2000.

Figure 29A:
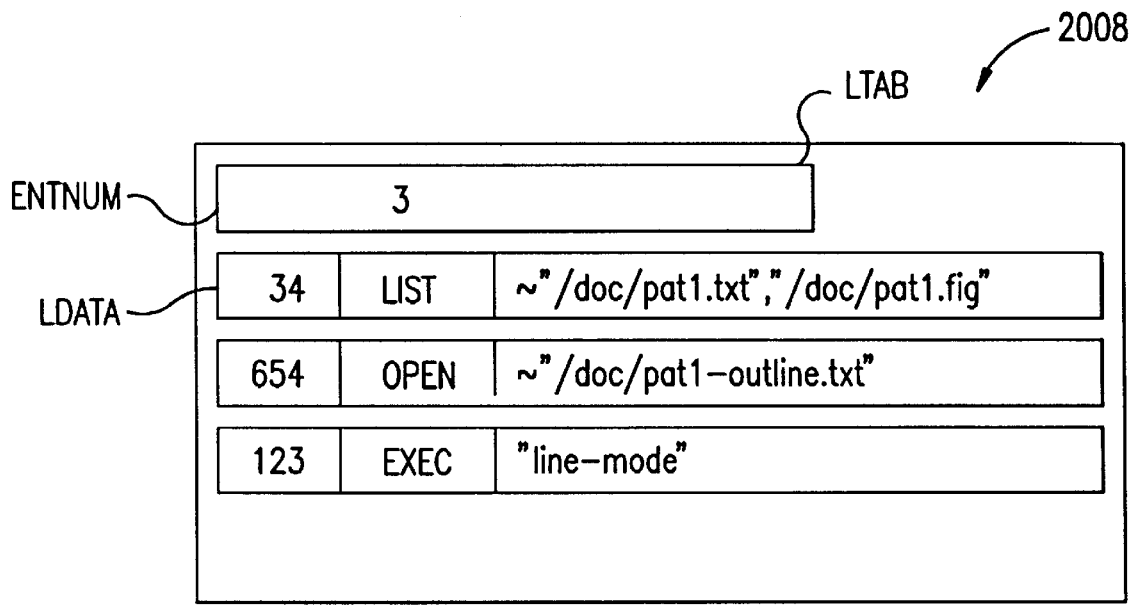
FIG. 29 is a structural diagram of the processing to be executed for the system of FIG. 26 when an object is indicated and of the data for managing the correspondence between an object and corresponding electronic information.

Next, the structure of the link storage unit 2008 will be explained by referring to FIG. 29. The link storage unit 2008 (LTAB) has a structure as shown in FIG. 29(a). Firstly, there is an area for storing the number of stored link information data LDATA, that is, the registration number area ENTNUM and then, link information LDATA of the number is stored. In the initial state of the link storage unit LTAB, 0 is stored in the registration number area ENTNUM and no link information data LDATA is registered. This link information data is accumulated by an operation of a user by the processing which will be described later.

Figure 29B:
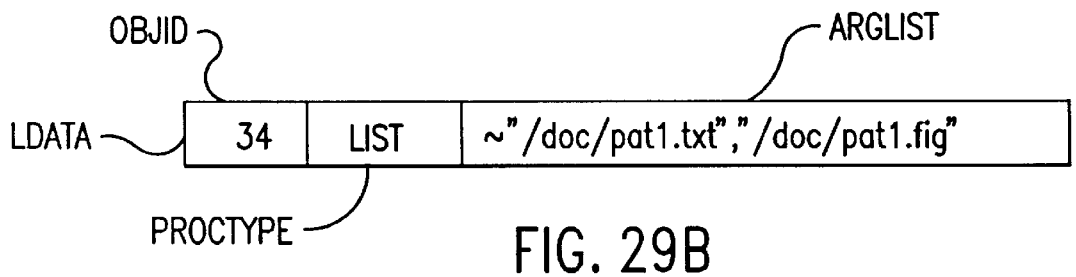

Next, the structure of the link information data LDATA will be explained by referring to FIG. 29 (b). At the top of each link information data LDATA, there is an area for storing the identification number of an object, that is, an identification number area OBJID. An identification number which is stored in this area is a number which is obtained from the object discrimination unit 2006. The second area of the link information data LDATA is an area for designating the processing to be executed by the system when an article having the identification number is indicated, that is, a processing designation area PROCTYPE. The third area is an argument area ARGLIST for storing the information which is used when the processing designated by the processing designation area PROCTYPE is executed. The processing designation area PROCTYPE stores one of "LIST" indicating the processing for displaying a list of positions of information linked with objects, "OPEN" indicating the processing for displaying information which is opened by a suitable program, and "EXEC" indicating the processing for executing any program. When "LIST" is stored in the processing designation area PROCTYPE, character strings of positions of information linked with objects are stored in the argument area ARGLIST. There is a case that no character string is stored in the argument area ARGLIST or a case that a plurality of character strings are stored. For example, when the processing designated by the link information data LDATA shown in FIG. 29b is executed, "LIST" is stored in the processing designation area PROCTYPE. Therefore, the system indicates a character string of "~/doc/patl.txt" or "~/doc/patl.fig" to a user in a form of list.

Figure 30:
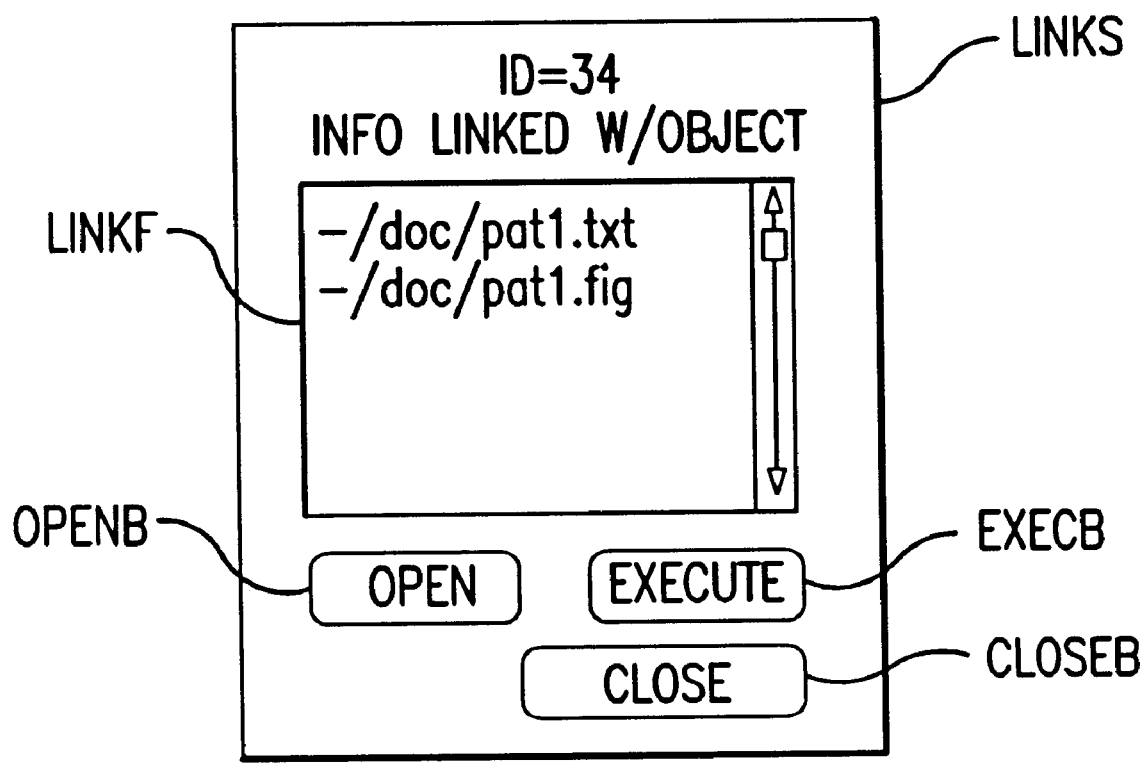
FIG. 30 is a drawing showing an example of list display of an object and corresponding information for the system of FIG. 26.

Next, the display form of a link information sheet LINKS which is an example of a list which is displayed at this time is shown in FIG. 30. Each character string in the link list area LINKF indicates the position and the file name in the file system 2001. A user can select a suitable character string from the link list area LINKF so as to simply designate information linked with an object. When the processing is designated after the information is designated, the processing is executed for the information. To designate the processing, there are an open button OPENB for instructing to open the designated information using a suitable program and an execution button EXECB for instructing to execute the designated information by assuming it as a program. For example, when a user selects a character string of "~/doc/patl.txt" from the link list area LINKF and then instructs the open button OPENB, the system indicates the information which is stored in the position which is indicated by "~/doc/patl.txt" in the file system 2001 to the user by using a suitable program. For example, when the information is text information, the is system opens the information using a text editor and indicates it to the user. When the user instructs the close button CLOSEB, the display of the link information sheet LINKS disappears.

Figure 29C:
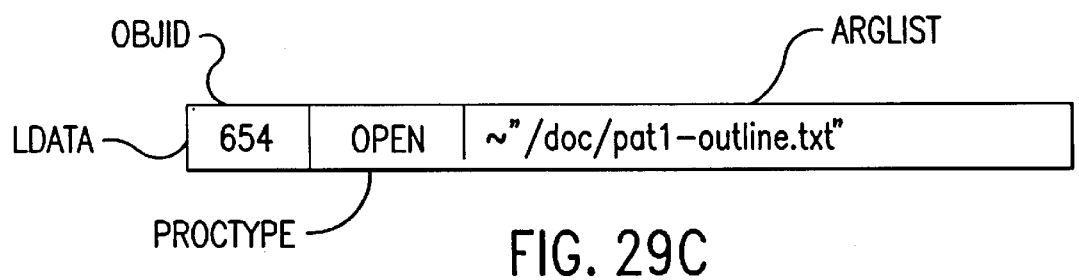
Figure 29D:
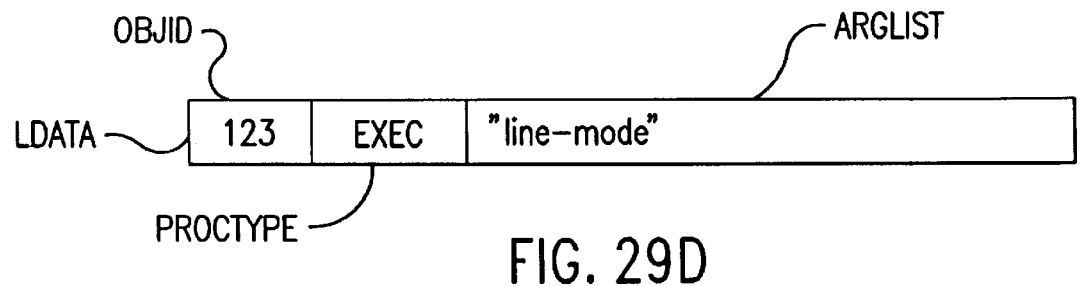

When the processing designated by the link information data LDATA shown in FIG. 29c is executed, "OPEN" is stored in the processing designation area PROCTYPE. Therefore, the system regards the element in the argument area ARGLIST as a position of the information and indicates it to the user in the open state, that is, in the state that the information is opened by a program for displaying or editing it. Such a program is decided, for example, by the last three characters of the character string indicating the position of the information. Namely, the system opens the file whose position and name are designated by a character string of "~/doc/patl-outline.txt" by a suitable program (for example, text editor) and indicates it to the user.

Figure 9A:
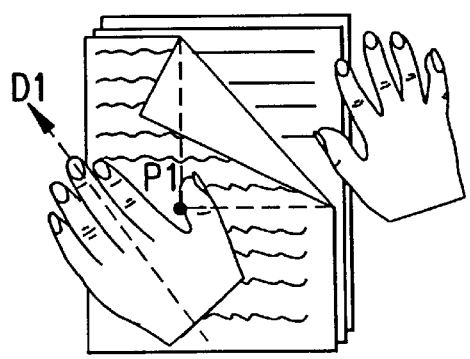
FIGS. 9a and 9b schematically depict page opening in accordance with preferred embodiments of the present invention.
Figure 9C:
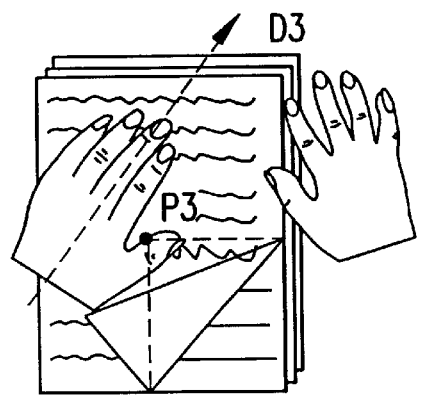
Figure 9B:
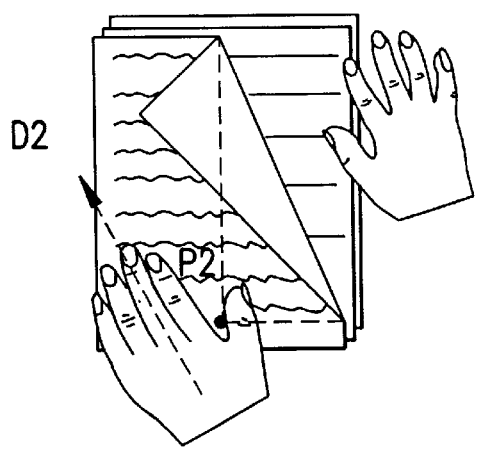
Figure 9D:
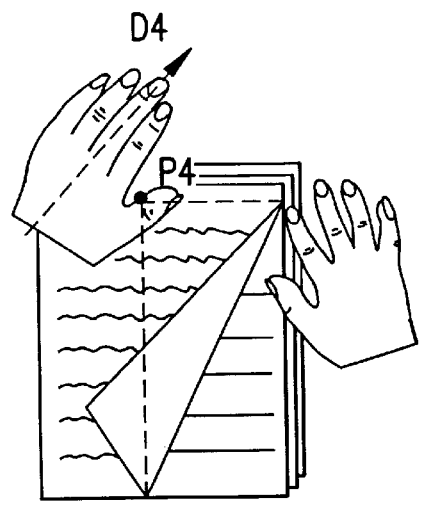

When the processing designated by the link information data LDATA shown in FIG. 9(d) is executed, "EXEC" is stored in the processing designation area PROCTYPE. Therefore, the system regards a character string of "line-mode" stored in the argument area ARGLIST as the name of the program to be executed and executes it. This is used, for example, so as to send an instruction for selecting a straight line drawing tool for a construction (drafting) program when a user indicates a ruler while the construction program is being executed.

Figure 31:
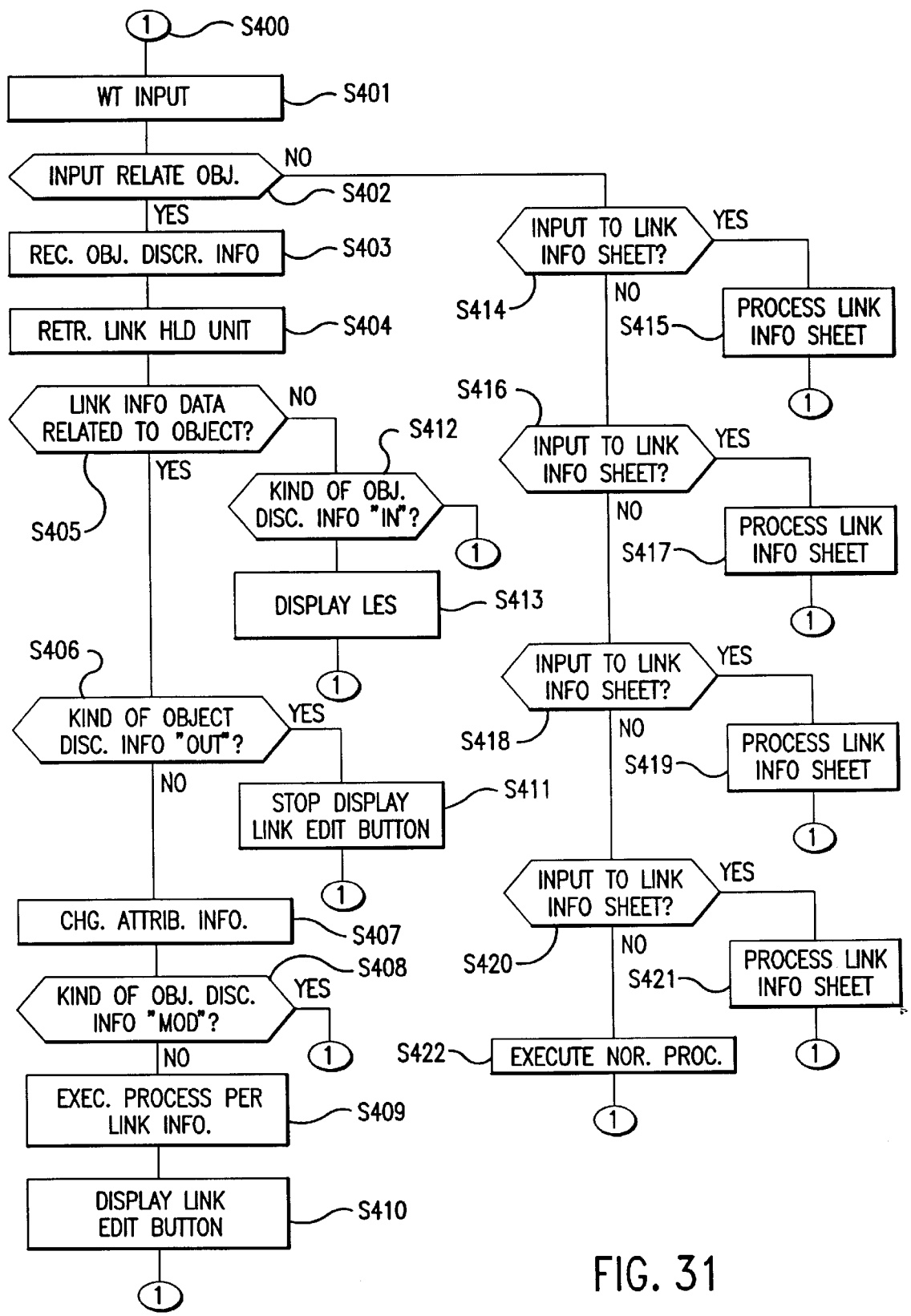
FIG. 31 is a processing flow chart of the file operation unit of the system of FIG. 26.

Next, the operation which is performed by the file operation unit 2000 when a user indicates an object will be explained by referring to FIG. 31. The file operation unit 2000 waits for input (Step S400), accepts it (Step S401), and checks whether it is input from the object discrimination unit 2006 (RECOG) (Step S402). When it is input from the object discrimination unit, the file operation unit 2000 receives information in the type explained in FIG. 28 (Step S403). The file operation unit 2000 reads the identification number stored in the object identification number area RID from the received object discrimination information RDATA and retrieves the link storage unit 2008 by the identification number (Step S404). Namely, the file operation unit 2000 checks link information data LDATA of the number stored in the registration number area ENTNUM in the link storage unit 2008 and retrieves the link information data LDATA in which the given identification number matches the value stored in the identification number area OBJID. The file operation unit 2000 switches the subsequent processing depending on whether the target link information data LDATA is extracted or not (Steps S405).

The operation of the file operation unit 2000 when such link information data LDATA exists will be explained hereunder. The file operation unit 2000 reads the value of the object input type RTYPE of the object discrimination information RDATA which is received from the object discrimination unit 2006 and switches the processing depending on whether it is "OUT" or not (Step S406). When the value of the object input type RTYPE is not "OUT", the file operation unit 2000 reads the values of the object write inhibit status area RRO and the object fixed status area RLOCK of the object discrimination information RDATA and reflects them to the attribute of the information linked with the object (Step S407). Namely, when "YES" is stored in the object write inhibit status area, the file operation unit 2000 inhibits the information lined with the object from writing. When "NO" is stored in the object write inhibit status area, the file operation unit 2000 cancels write inhibition of the information. When "YES" is stored in the object fixed status area RLOCK, the file operation unit 2000 fixes the information. When "NO" is stored in the object fixed status area RLOCK, the file operation unit 2000 cancels fixing of the information. Attributes such as file write inhibition and file fixing (movement and deletion are inhibited) and the changing method therefor are provided in the file system of almost all computer systems as a standard.

Next, the file operation unit 2000 checks whether the object input type RTYPE of the object discrimination information RDATA is "MOD" or not (Step S408). When the type is "MOD", the file operation unit 2000 ends the processing and returns to the input wait state (Step S400). When the value stored in the object input type RTYPE is not "MOD", that is, when it is "IN", the file operation unit 2000 executes the processing according to the content of the link information data LDATA which can be retrieved from the link storage unit 2008 (Step S409). The content of processing is already described in the explanation of the link information data LDATA. Next, the file operation unit 2000 displays the link editing button LEB (Step S410).

The link editing button LEB is used by a user so as to instruct to start link editing of an object. An example of display form of the link editing button LEB is shown in FIG. 32. The operation when a user presses the link editing button LEB will be explained later (Step S416). The display of the link editing button is erased when the user stops the indication of the object, that is, when the file operation unit 2000 detects that "OUT" is stored in the object input type RTYPE in the object discrimination data RDATA which is inputted from the object discrimination unit 2006 (Steps S406, S411).

Next, the operation of the file operation unit 2000 when the processing for the object indicated by the user is not registered in the link storage unit 2008 will be explained. Namely, the operation when the retrieval result is not found at Step S404 of retrieval of the link storage unit 2008 and at Step S405 of decision of whether there is a retrieval result or not will be explained (Step S412 and subsequent steps). Firstly, the file operation unit 2000 checks whether the type stored in the object input type RTYPE is "IN" or not (Step S412). When the type is not "IN", the file operation unit 2000 ends the processing and returns to the input wait state (Step S400). When the object input type RTYPE is "IN", the file operation unit 2000 regards the object as a one which is indicated first and starts the link definition function. The link definition function is a function for designating the information corresponding to an indicated object or designating the kind of processing to be executed. Concretely, the function displays the link editing sheet LES as shown in FIG. 33 (Step S407). When any document is displayed already when the link editing sheets LES is to be displayed, the function displays a link button LB as shown in FIG. 34 on the display of the document or in the neighborhood thereof. The processing when the user presses the link button LB will be described later (Step S420 and subsequent steps).

Following in an explanation of the operations when a user starts indication of an object, and he changes the status of the object, and he stops the indication of the object ends. Next, the operation when the input of a user is not indication of an object will be explained (Step S414 and subsequent steps).

When the input is f or the link information sheet LINKS, the file operation unit 2000 executes the processing which is described in the explanation of the link information sheet LINKS (Step S414, 415). When the input is for the link editing button LEB, the file operation unit 2000 opens the link editing sheet LEB in the same way as with the processing when an object is indicated first (Step S413) and also displays the link button LB when a document is displayed (Step S416, S417) . The operation when the input is for the link editing sheet LES will be explained (Step S418, S419).

To indicate an object whose link is to be edited, the identification number of the object is displayed on the link editing sheet. When the link information data LDATA relating to the object is stored in the link storage unit 2008, it is displayed on the basis of the content thereof. There is no link information data LDATA for an object which is indicated first, so that the link editing sheet LED is displayed in the initial state. To designate the processing when an object is indicated, there are a list designation button PLISTB, an open instruction button POPENB, and an execution instruction button PEXECB. According to the button which is instructed by a user, the value to be stored in the processing designation area in the corresponding link information data LDATA is decided. When the user instructs the list instruction button PLISTB, "LIST" is stored, and when the user instructs the open instruction button POPENB3, "OPEN" is stored, and when the user instructs the execution instruction button PEXECB, "EXEC" is stored. In the initial state, the list instruction button PLISTB is instructed.

There is a link area LISTF on the link editing sheet LES. The link list area LISTF is used to display a list of character strings indicating positions of information linked with objects. This is the same as that displayed on the. link information sheet LINKS. In the link list area LISTF, the character strings stored in the argument area ARGLIST in the link information data LDATA relating to the object are displayed. In the initial state, no character string is registered in the link list area LISTF. When the user instructs the link deletion button UNLINKB after a character string is selected in the link list area LISTF, the selected character string is deleted from the link list area LISTF and the link between the information stored in the position which is indicated by the character string and the object disappears.

The file name input area NAMEF on the link editing sheet LES is an area into which the user inputs the position of the information to be linked with the object from the keyboard 2003 (KB). When the user inputs the information position into the area and then instructs the link addition button ADDB, the character string which is imputed in the file name input area NAMEF is added to the link list area LISTF. If this occurs, the character strings which are inputted in the file name input area NAMEF disappear.

A list of character strings indicating positions of information stored in the file system FS is displayed in the file name selection area FILEF. When the user selects a character string in the file name selection area FILEF and instructs the link addition button ADDB, the character string which is selected at that time is added to the link list area LISTF.

When the user presses the OK button OKB on the link editing sheet LES, the link information data LDATA is updated or generated according to the status of the link editing sheet LES at that time. Namely, if there is link information data LDATA relating to an object in the link storage unit 2008 (LTAB) already when the link editing sheet LES is displayed, the content thereof is updated. When there is no link information data LDATA, new link information data LDATA is generated. If this occurs, the displayed of the link editing sheet LES and the link button LB are erased. When the user presses the discard button DISCARDB on the link editing sheet LES, the operation results for the link editing sheet LES until then are discarded. Namely, the link information data is neither updated nor generated. Also in this case, the displays of the link editing sheet LES and the link button LB are erased.

Next, the operation when the input to the file operation unit 2000 is the one to the link button LB will be explained (Steps S420, S421). In this case, the character string indicating the position of the document having the attached link button LB is added to the link list area LISTF on the link editing sheet LES. The link button LB saves the trouble of designating the position of information corresponding to an object by a user.

When the input to the file operation unit 2000 does not correspond to any of the aforementioned, the file operation unit 2000 executes the normal processing (Step S422). The normal processing of the file operation unit 2000 is, for example, copying or deletion of a file or starting of a program..

Next, the execution of the processing for information corresponding to an object will be explained. The processing is explained above as normal processing of the file operation unit 2000. It is convenient if unsuitable processing is prevented from execution when information corresponding to an object is processed. For example, when a user attempts to delete information corresponding to an object, it is convenient if there is processing for suppressing the processing from execution or for confirming the user whether it may be deleted actually. When information corresponding to an object is to be processed, it is convenient if suitable processing can be added automatically. For example, when a user attempts to copy information corresponding to an object, it is convenient if the user is inquired as to whether the link information relating to the file is also copied and the link information can be copied as a result of it.

Figure 35:
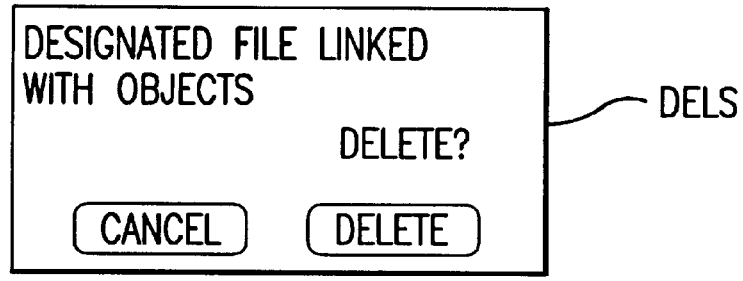
FIG. 35 is a drawing showing an example of screen display for confirming a user execution of deletion, with the system of FIG. 26.

The operation by a user for electronic information is executed via the file operation unit 2000, s0 that the aforementioned processing suppression and addition can be realized by ascertaining the content of the link storage unit LTAB before the file operation unit 200 adds processing to the information and by checking whether the information to which the processing is to be added corresponds to the object. For example, when the user outputs an instruction for deleting electronic information, the file operation unit 2000 checks the argument area ARGLIST of all the link information data LDATA stored in the link storage unit 2008 and examines whether there is a character string indicating the position of the information which is to be deleted. When there is such a character string, the file operation unit 2000 displays the deletion confirmation sheet DELS, for example, as shown in FIG. 35, and confirms the user's intention.

When the user instructs the deletion button DELB, the file operation unit 2000 executes deletion. If this occurs, the file operation unit 2000 deletes the character string from all the link information data LDATA holding the character string indicating the information position. When the user instructs the cancel button CANCELB, the file operation unit 2000 stops the deletion processing.

Figure 36:
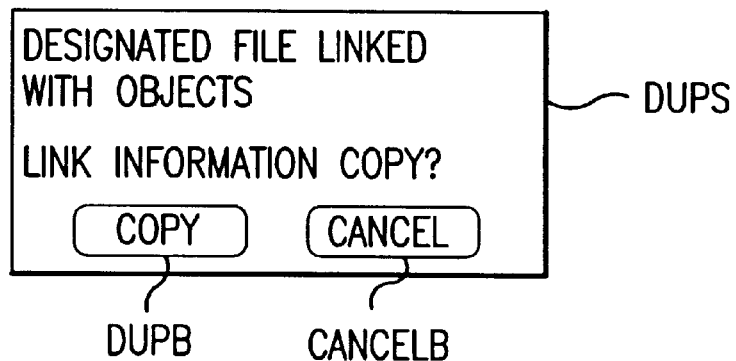
FIG. 36 is a drawing showing an example of screen display for confirming she processing for copying to a user, with the system of FIG. 26.

When the user instructs copying of electronic information, the file operation unit 2000 executes copying of the information. Furthermore, the file operation unit 2000 checks whether the information is linked with the object in the same way as with deletion. When the information is linked, the file operation unit 2000 displays the copy confirmation sheet DUPS, for example, as shown in FIG. 36 and inquires the user as to whether the link information is also copied. When the user instructs the copy button DUPB, the file operation unit 2000 adds the character string indicating the position of the copied information to all the link information data LDATA holding the character string indicating the information position. When the user instructs the cancel button CANCELB, the file operation unit 2000 does not execute copying of the link information, that is, adding of the character string to the link information data LDATA.

Figures 37A, 37B:
FIG. 37 is a drawing showing an example of a change of icon display depending on linking or nonlinking with the system of FIG. 26.

Furthermore, it is convenient if the display form of electronic information is changed depending on linking or nonlinking so as to make it easy to understand whether the electronic information is linked or not. FIG. 37 shows is an example of the display of an icon indicating electronic information. FIG. 37(*a*), shows an example that information is not linked. When the information is linked, as shown in FIG. 37(*b*), a display of something like a string "s" indicating the link is added to the icon. By doing this, the user can know whether the information of the icon is linked or not from the display of the icon.

As mentioned above, according to the aforementioned embodiment, it is possible to make electronic information correspond to an object, so that only by indicating the object to the system, the related information can be taken out easily. Via the operation for an object, the attribute of the corresponding information can be changed, so that even when a user does not know how to change the attribute on the information processing unit, he can change the attribute intuitively. By suppressing the processing for the information corresponding to the object, it is possible to prevent the information from deletion by mistake. Furthermore, making electronic information correspond to an object or changing the attribute via an object can be executed interactively, so that the aforementioned advantage can be taken out more simply.

According to the present invention, making electronic information correspond to an object can be executed interactively on the display screen and an intuitive reference and operation to electronic information can be performed.

According to this invention, actual objects themselves can be used as man-machine interface parts because they are associated with the image objects (display objects) displayed on a display unit. This enables the establishment of an instinctive operating environment, thereby improving the operation efficiency of the man-machine interface by a large margin.

In addition, specification by menus and icons is unnecessary during operation and objects can be operated without any mode set because the hand gesture is recognized. This is effective in improving the operation efficiency of the man-machine interface by a large margin.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An information processing system, comprising:

a file storage unit which stores electronic information;

a display unit which displays said electronic information;

a discrimination unit which discriminates each of a plurality of physical objects indicated by a user;

a link storage unit which stores link information designating a correspondence between each of said physical objects and a respective corresponding portion of the electronic information stored in said storage unit; and a file operation unit which changes an appearance of the electronic information on the display when the electronic information displayed is said corresponding portion of the electronic information which corresponds to at least one of said physical objects.

2. An information processing system according to claim 1, wherein another portion of said electronic information which does not correspond to said physical objects is displayed on the display device in an unlinked appearance, said file operation unit changing the appearance of the electronic information to a linked appearance when the electronic information displayed is said corresponding portion of the electronic information which corresponds to at least one of said physical objects, said linked appearance being different from said unlinked appearance.

3. An information processing system according to claim 2, wherein said unlinked appearance is a standard icon, and said linked appearance is a modified icon.

4. A method of information processing, said method comprising the acts of:

storing electronic information in a file storage unit;

displaying said electronic information on a display unit;

discriminating each of a plurality of physical objects indicated by a user using a discrimination unit;

storing link information designating a correspondence between each of said physical objects and a respective corresponding portion of the electronic information stored in said storage unit in a link storage unit; and changing an appearance of the electronic information on the display when the electronic information displayed is said corresponding portion of the electronic information which corresponds to at least one of said physical objects using a file operation unit.

5. A method of information processing according to claim 4, wherein another portion of said electronic information which does not correspond to said physical objects is displayed on the display device with an unlinked appearance, said changing act changing the appearance of the electronic information to a linked appearance when the electronic information displayed is said corresponding portion of the electronic information which corresponds to at least one of said physical objects, said linked appearance being different from said unlinked appearance.

6. A method of information processing according to claim 5, wherein said unlinked appearance is a standard icon, and said linked appearance is a modified icon.

7. An information processing system, comprising:

a file storage unit which stores electronic information;

a display unit which displays said electronic information;

a discrimination unit which discriminates each of a plurality of physical objects indicated by a user;

a link storage unit which stores link information designating a correspondence between each of said physical objects and a respective corresponding portion of the electronic information stored in said storage unit; and a file operation unit which performs different or additional operations on said corresponding portion of the electronic information which corresponds to at least one of said physical objects when said corresponding portion of the electronic information is manipulated.

8. An information processing system according to claim 7, wherein said different or additional operations comprise issuing a warning message when the user attempts to delete or move said corresponding portion of the electronic information.

9. An information processing system according to claim 7, wherein said file operation unit changes an appearance of the electronic information on the display when the electronic information displayed is said corresponding portion of the electronic information which corresponds to at least one of said physical objects.

10. A method of information processing, said method comprising the acts of:

storing electronic information in a file storage unit;

displaying said electronic information on a display unit;

discriminating each of a plurality of physical objects indicated by a user using a discrimination unit;

storing link information designating a correspondence between each of said physical objects and a respective corresponding portion of the electronic information stored in said storage unit using a link storage unit; and performing different or additional operations on said corresponding portion of the electronic information which corresponds to at least one of said physical objects when said corresponding portion of the electronic information is manipulated using a file operation unit.

11. A method of information processing according to claim 10, wherein said performing different or additional operations act comprises issuing a warning message when the user attempts to delete or move said corresponding portion of the electronic information.

12. An information processing system according to claim 10, further comprising the act of changing an appearance of the electronic information on the display when the electronic information displayed is said corresponding portion of the electronic information which corresponds to at least one of said physical objects using said file operation unit.

13. An information processing system, comprising:

a file storage unit which stores electronic information;

a display unit which displays said electronic information;

a discrimination unit which discriminates each of a plurality of physical objects indicated by a user;

an attribute discrimination unit which discriminates changeable attribute information of said physical objects;

a link storage unit which stores link information designating a correspondence between each of said physical objects and a respective corresponding portion of the electronic information stored in said storage unit; and a file operation unit which changes attributes of said corresponding portion of the electronic information which corresponds to at least one of said physical objects when said changeable attribute information of at least one of said physical objects is changed.

14. An information processing system according to claim 13, wherein said changeable attribute information of said physical objects comprises at least one check box located on the physical object.

15. An information processing system according to claim 13, wherein said file operation unit changes an appearance of the electronic information on the display when the electronic information displayed is said corresponding portion of the electronic information which corresponds to at least one of said physical objects.

16. An information processing system according to claim 13, wherein said file operation unit performs different or additional operations on said corresponding portion of the electronic information which corresponds to at least one of said physical objects when said corresponding portion of the electronic information is manipulated.

17. An information processing system according to claim 15, wherein said file operation unit performs different or additional operations on said corresponding portion of the electronic information which corresponds to at least one of said physical objects when said corresponding portion of the electronic information is manipulated.

18. A method of information processing, said method comprising the acts of:

storing electronic information in a file storage unit;
   displaying said electronic information on a display unit;
   discriminating each of a plurality of physical objects indicated by a user using a discrimination unit;
   discriminating changeable attribute information of said physical objects using an attribute discrimination unit;
   storing link information designating a correspondence between each of said physical objects and a respective corresponding portion of the electronic information stored in said storage unit in a link storage unit; and
   changing attributes of said corresponding portion of the electronic information which corresponds to at least one of said physical objects when said changeable attribute information of at least one of said physical objects is changed using a file operation unit.

19. A method of information processing according to claim 18, wherein said changeable attribute information of said physical objects comprises at least one check box located on the physical object.

20. A method of information processing according to claim 18, further comprising the act of changing an appearance of the electronic information on the display when the electronic information displayed is said corresponding portion of the electronic information which corresponds to at least one of said physical objects using said file operation unit.

21. A method of information processing according to claim 18, further comprising the act of performing different or additional operations on said corresponding portion of the electronic information which corresponds to at least one of said physical objects when said corresponding portion of the electronic information is manipulated using a file operation unit.

22. A method of information processing according to claim 20, further comprising the act of performing different or additional operations on said corresponding portion of the electronic information which corresponds to at least one of said physical objects when said corresponding portion of the electronic information is manipulated using a file operation unit.

* * * * *